US012226791B2

(12) United States Patent
McLaughlin et al.

(10) Patent No.: US 12,226,791 B2
(45) Date of Patent: Feb. 18, 2025

(54) DISPENSER WITH AIR MIXING

(71) Applicant: Graco Minnesota Inc., Minneapolis, MN (US)

(72) Inventors: Ethan G. McLaughlin, Strasburg, OH (US); William R. Anderson, Canal Fulton, OH (US); Jonathan R. McMichael, Canton, OH (US); Steven R. Sinders, North Canton, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/225,953

(22) Filed: Jul. 25, 2023

(65) Prior Publication Data

US 2024/0042468 A1 Feb. 8, 2024

Related U.S. Application Data

(60) Provisional application No. 63/420,990, filed on Oct. 31, 2022, provisional application No. 63/395,672, filed on Aug. 5, 2022.

(51) Int. Cl.

| | |
|---|---|
| ***B05B 7/04*** | (2006.01) |
| ***B01F 23/23*** | (2022.01) |
| ***B01F 25/72*** | (2022.01) |

(52) U.S. Cl.

CPC ........ *B05B 7/0433* (2013.01); *B01F 23/2319* (2022.01); *B01F 25/72* (2022.01); *B05B 7/0408* (2013.01)

(58) Field of Classification Search

CPC ................. B05B 7/0408; B05B 7/0433; B01F 23/2319; B01F 25/72

(Continued)

(56) References Cited

U.S. PATENT DOCUMENTS 1,399,006 A * 12/1921 Terence .................. F23D 11/10 239/404
2,603,280 A * 7/1952 Bernhard .............. F23D 11/408 239/428

(Continued)

FOREIGN PATENT DOCUMENTS

CN 201371543 Y 12/2009
DE 4237349 C1 11/1993

(Continued)

OTHER PUBLICATIONS

Google English translation of DE19754969 (Year: 1999).*
Extended European Search Report for EP Application No. 23188472.7, Dated Dec. 7, 2023, pp. 8.

*Primary Examiner* — Chee-Chong Lee
(74) *Attorney, Agent, or Firm* — Kinney & Lange, P. A.

(57) ABSTRACT

A nozzle assembly includes a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator is configured to flow nucleation air to a location downstream of an upstream end of the mixer and into a flow of the plural component material.

19 Claims, 17 Drawing Sheets

(58) Field of Classification Search
USPC ........................................................ 239/290
See application file for complete search history.

(56) References Cited

U.S. PATENT DOCUMENTS

| | | | | | |
|---|---|---|---|---|---|
| 4,255,125 | A * | 3/1981 | Auclair | F23D 11/102 | 239/402 |
| 4,674,888 | A * | 6/1987 | Carlson | B01F 25/43151 | 162/57 |
| 5,388,764 | A * | 2/1995 | Moses | B29B 7/7438 | 239/596 |
| 5,405,083 | A | 4/1995 | Moses | | |
| 5,480,597 | A | 1/1996 | Ishida et al. | | |
| 5,645,223 | A | 7/1997 | Hull et al. | | |
| 5,893,486 | A | 4/1999 | Wasmire | | |
| RE36,674 | E | 4/2000 | Gluck et al. | | |
| 6,131,823 | A * | 10/2000 | Langeman | B05B 7/066 | 239/291 |
| 6,132,396 | A * | 10/2000 | Antanavich | A61B 17/00491 | 604/82 |
| RE37,115 | E | 3/2001 | Fiorentini et al. | | |
| 6,578,777 | B2 * | 6/2003 | Bui | B05B 7/0475 | 239/406 |
| 6,601,782 | B1 * | 8/2003 | Sandholm | B05B 7/0815 | 239/600 |
| 6,672,519 | B2 | 1/2004 | Hunter et al. | | |
| 6,951,310 | B2 * | 10/2005 | Anderson | B05B 7/0861 | 239/427 |
| 7,690,539 | B1 | 4/2010 | Tudor et al. | | |
| 9,770,728 | B2 | 9/2017 | Hiemer et al. | | |
| 10,687,795 | B2 | 6/2020 | Sharma et al. | | |
| 2008/0149023 | A1 | 6/2008 | Torborg | | |

FOREIGN PATENT DOCUMENTS

| | | | |
|---|---|---|---|
| DE | 19754969 | A1 | 6/1999 |
| WO | 2006007551 | A1 | 1/2006 |

* cited by examiner

DISPENSER WITH AIR MIXING

CROSS-REFERENCE TO RELATED APPLICATION(S)

This application claims the benefit of U.S. Provisional Application No. 63/420,990 filed Oct. 31, 2022 and U.S. Provisional Application No. 63/395,672 filed Aug. 5, 2022.

BACKGROUND

This disclosure relates generally to plural component dispensing systems and more particularly to systems, methods, and apparatuses for introducing air to plural component mixtures to dispense plural component materials.

Plural component materials are formed by two or more constituent materials combining to form the plural component material. The constituent materials are individually pumped or metered and are combined prior to application. The resultant plural component material can be an insulator, such as foam, or can be paint, sealant, coating, adhesive, etc.

SUMMARY

According to one aspect of the present disclosure, an example of a nozzle assembly includes a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator is configured to flow nucleation air to a location downstream of the mixer and into a flow of the plural component material.

According to a further aspect of the present disclosure, an example of a method of dispensing a plural component material comprises receiving a first material and a second material at an inlet of a mixing channel. The mixing channel has upstream and downstream ends defining a first flow direction through the mixing channel and includes a housing wall that defines a flow passage. The method further includes flowing the first material and the second material through a mixer disposed within the flow passage to produce a plural component material, flowing nucleation air into the plural component material to form an aerated plural component material, and dispensing the aerated plural component material. The nucleation air is flowed into the plural component material at a location downstream of the mixer in a second flow direction.

According to yet a further aspect of the present disclosure, an example of a method of forming a nozzle assembly includes inserting a polymer mixing tube into a shroud, forming a hole in the polymer mixing tube using a guide hole, and inserting a nucleating air channel through the guide hole and the hole in the polymer mixing tube to extend into the flow passage. The polymer mixing tube comprises a polymer wall defining a flow passage having upstream and downstream ends and also comprises a mixer. Polymer wall comprises an inlet portion and a tip orifice. The inlet portion is disposed at the upstream end and configured to receive a first material and a second material. The tip orifice is disposed at the downstream end and is configured to emit a plural component mixture formed from the first material and the second material. The mixer is disposed downstream of the inlet portion and upstream of the tip orifice and is configured to mix the first material and the second material into the plural component material. The shroud comprises a shroud wall that at least partially circumferentially surrounds the polymer mixing tube when the polymer tube is inserted into the shroud and a guide hole that extends through the shroud wall.

According to yet a further aspect of the present disclosure, an example of a nozzle assembly comprises a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator is configured to flow nucleation air to a location downstream of the mixer and into a flow of the plural component material. The aerator comprises a nucleation air air line extending through the housing wall, where the air line defines an internal air passage.

According to yet a further aspect of the present disclosure, an of a nozzle assembly comprises a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator is configured to flow nucleation air to a location downstream of the mixer and into a flow of the plural component material. The aerator comprises a nucleation air passage extending from an exterior of the housing wall to an interior of the housing wall through the tip orifice. The air passage defines an internal air passage.

According to yet a further aspect of the present disclosure, an example of a nozzle assembly comprises a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator is configured to flow nucleation air into a flow of the plural component material downstream of the mixer. The aerator comprises an attachment housing disposed at a downstream end of the mixing channel. The attachment housing defines an air outlet, a flow inlet, a spray outlet. The air outlet is configured to flow nucleation air to a location downstream of the tip orifice to create aerated plural component material. The flow inlet extends from upstream of the air outlet to downstream of the air outlet and is configured to accept a flow of aerated plural component material. The spray outlet is downstream of the flow inlet and is configured to emit the aerated plural component material.

According to yet a further aspect of the present disclosure, an example of a nozzle assembly comprises a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator comprises a tapered tip at a first end of a passage housing, an air outlet defined in the tapered tip, an air inlet formed in a second end of the passage housing, and an air passage defined by the passage housing. The air passage fluidly connects the air inlet to the air outlet. The aerator is configured to flow nucleation air from the air inlet to the air outlet and from the air outlet into the flow passage at a location downstream of the mixer and into a flow of the plural component material.

According to yet a further aspect of the present disclosure, an example of an aerator includes a tapered tip at a first end of a passage housing, an air outlet defined in the tapered tip, an air inlet formed in a second end of the passage housing, and an air passage defined by the passage housing. The passage housing extends along an axis and the air passage fluidly connects the air inlet to the air outlet.

According to yet a further aspect of the present disclosure, an example of a nozzle assembly includes a mixing channel and an aerator. The mixing channel has upstream and downstream ends defining a flow direction through the mixing channel and includes a housing wall and a mixer. The housing wall defines a flow passage and includes an inlet portion and a tip orifice. The inlet portion disposed at the upstream end and configured to receive a first material and a second material. The tip orifice is disposed at the downstream end and is configured to emit a plural component material from the mixing channel. The mixer is disposed within the mixing channel and is configured to mix the first material and the second material into the plural component material. The aerator is configured to flow nucleation air to a location downstream of an upstream end of the mixer and into a flow of the plural component material.

According to a further aspect of the present disclosure, an example of a method of dispensing a plural component material comprises receiving a first material and a second material at an inlet of a mixing channel. The mixing channel has upstream and downstream ends defining a first flow direction through the mixing channel and includes a housing wall that defines a flow passage. The method further includes flowing the first material and the second material through a mixer disposed within the flow passage to produce a plural component material and flowing nucleation air into the plural component material to form an aerated plural component material. The nucleation air is flowed into the plural component material at a location downstream of an upstream end the mixer and is flowed in a second flow direction.

DETAILED DESCRIPTION

This disclosure is related to systems, methods, and apparatuses for dispensing plural component materials, such as foams, among other options. Multiple constituent materials are combined at a dispenser to form a heterogenous mixture that is subsequently aerated by the introduction of air within the spray nozzle. As will be described subsequently, the systems, methods, and apparatuses disclosed herein introduce air within the spray nozzle such that the air is capable of creating, aerating, and spraying a plural component material from multiple component materials and air. The systems, methods, and apparatuses disclosed herein are able to produce a plural component material with superior foam characteristics, such as improved cell homogeneity, reduced cell size, reduced presence of voids in the cell structure, etc., over existing systems, methods, and apparatuses for producing foam. The systems, methods, and apparatuses disclosed herein are also less complex than existing systems, methods, and apparatus and accordingly are able to produce high-quality foams at lower cost than existing systems, methods, and apparatuses.

Figure 1:
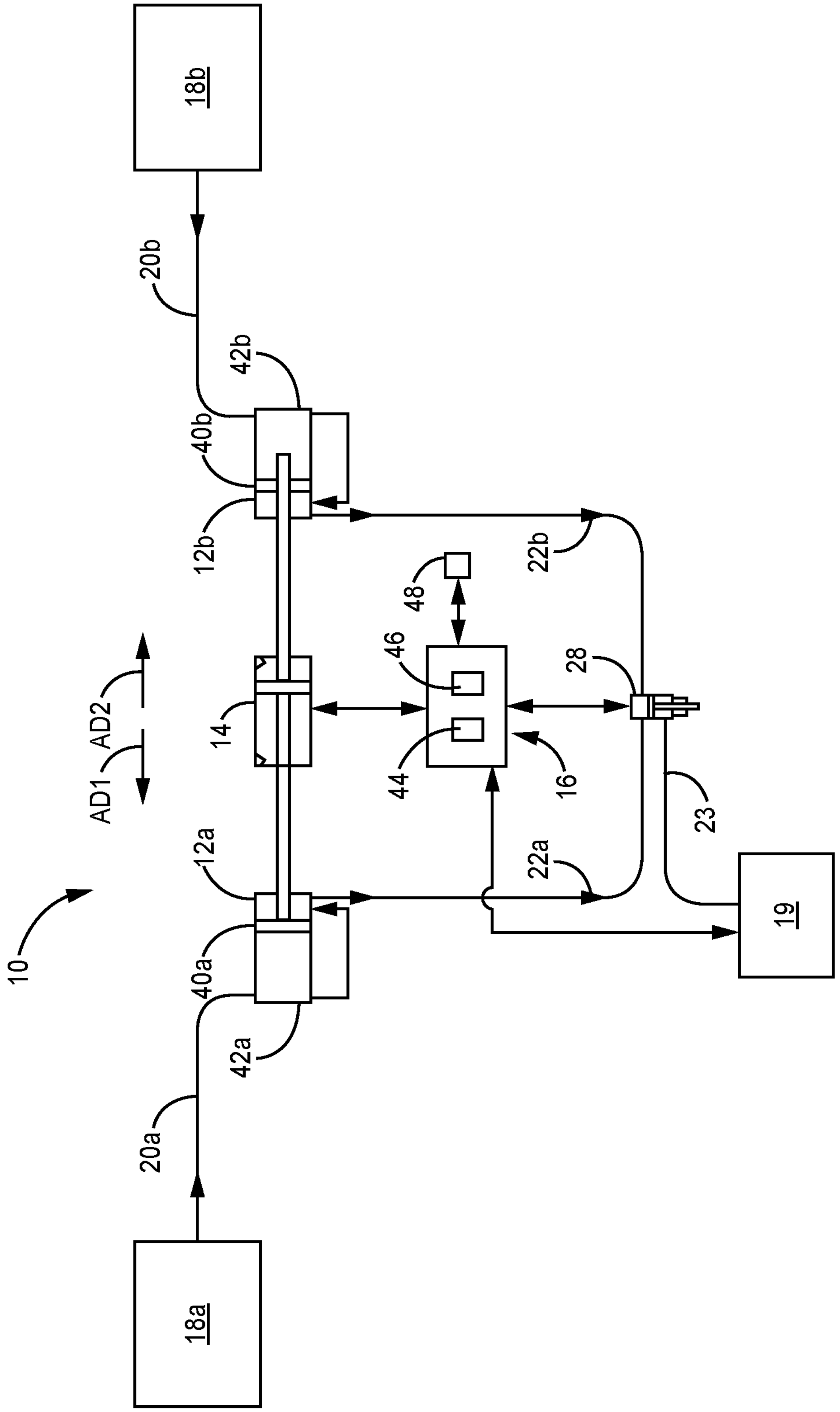
FIG. 1 is a schematic diagram of an example of a plural component dispense system.

FIG. 1 is a schematic diagram of plural component dispense system 10. Plural component dispense system 10 includes material pumps 12*a*, 12*b*; pump drive 14; controller 16; material supplies 18*a*, 18*b*; air source 19; feed lines 20*a*, 20*b*; output lines 22*a*, 22*b*; air line 23; and dispenser 28. Controller 16 includes memory 44, control circuitry 46, and user interface 48.

Plural component dispense system 10 is a plural component dispensing system configured to combine constituent components to form a resultant plural component material. For example, the plural component material can be an insulator, such as foam, or can be paint, sealant, coating, adhesive, etc. In some examples, plural component dispense system 10 is configured to combine a first constituent material, such as a resin (e.g., polyol resin), and a second constituent material, such as a catalyst (e.g., isocyanate), that combine to form a spray foam. While plural component dispense system 10 is shown and described as a system that combines two constituent materials to form the plural component material, it is understood that plural component dispense system 10 can be configured to combine more than two constituent materials to form the plural component material.

Material supplies 18*a*, 18*b* store the individual constituent materials. For example, each material supply 18*a*, 18*b* can be formed as a tank, drum, etc. Material pumps 12*a*, 12*b* receive the constituent materials from material supplies 18*a*, 18*b* through feed lines 20*a*, 20*b* and pump the constituent materials downstream through output lines 22*a*, 22*b*. Each output line 22*a*, 22*b* connects to dispenser 28, discussed in more detail subsequently. In the example shown, material pumps 12*a*, 12*b* are disposed to receive the first and second constituent materials from material supplies 18*a*, 18*b*, respectively. Feed lines 20*a*, 20*b* extend to material pumps 12*a*, 12*b* from material supplies 18*a*, 18*b*. Output lines 22*a*, 22*b* extend downstream from material pumps 12*a*, 12*b*, respectively, to dispenser 28.

The material pumps 12*a*, 12*b* pressurize the constituent materials and drive the constituent materials through output lines 22*a*, 22*b*. In some examples, the constituent materials are pressurized to an upstream pressure level greater than ambient prior to being received by material pumps 12*a*, 12*b*. The material pumps 12*a*, 12*b* then increase the pressures of the constituent materials to a downstream pressure level greater than the upstream pressure level and drive the constituent materials downstream through the output lines 22*a*, 22*b* according to the downstream pressure level. For example, the material supplies 18*a*, 18*b* can be pressurized tanks that output the pressurized constituent materials or plural component dispense system 10 can include upstream pumps that draw the constituent materials from the material supplies 18*a*, 18*b* and drive the constituent materials through the feed lines 20*a*, 20*b* and to the material pumps 12*a*, 12*b*, among other options. Such upstream pumps can also be referred to as transfer pumps. Material pumps 12*a*, 12*b* can also be referred to as metering pumps because material pumps 12*a*, 12*b* output the constituent materials at a metered flow rate to generate a desired mix at dispenser 28. Output lines 22*a*, 22*b* can also each include one or more valves for controlling the flow of each constituent material to dispenser 28.

In the example shown, material pumps 12*a*, 12*b* are linked for simultaneous reciprocation. Linking material pumps 12*a*, 12*b* for simultaneous reciprocation causes pumps to output the constituent materials according to a desired ratio for mixing and generating the plural component material. More specifically, material pumps 12*a*, 12*b* are connected to pump drive 14 to be reciprocated by pump drive 14. Material pumps 12*a*, 12*b* and pump drive 14 can be considered to form a pump assembly of the plural component dispense system 10. The material pumps 12*a*, 12*b* respectively include fluid displacers 40*a*, 40*b*, such as pistons or diaphragms, among other options, that are reciprocated to pump the constituent materials. Pump drive 14 can be of any desired configuration suitable for driving reciprocation of the fluid displacers 40*a*, 40*b*. For example, pump drive 14 can be an electric motor, pneumatically drive, hydraulically drive, etc. Controller 16 is operatively connected, electrically and/or communicatively, to pump drive 14 to control the speeds of material pumps 12*a*, 12*b*. For example, controller 16 can be operatively connected to a motor controller of the electric motor or to a fluid supply configured to route driving fluid (e.g., compressed air or hydraulic oil) to drive linear displacement, etc.

In the example shown, material pumps 12*a*, 12*b* are configured as piston pumps such that fluid displacers 40*a*, 40*b* are formed as pistons that reciprocate within cylinders 42*a*, 42*b*, respectively. In the example shown, material pumps 12*a*, 12*b* are configured as double displacement pumps that output the constituent materials during both a stroke in a first axial direction AD1 and a stroke in an opposite, second axial direction AD2.

Air source 19 is a source of air for creating an aerated mixture, such as a foam, at dispenser 28. Air line 23 fluidly connects air source 19 to dispenser 28. The air supplied by air line 23 can be pressurized air, such that the air provided via air line 23 can be used to create an aerated plural component material at dispenser 28. The air provided by air line 23 can also be used to accelerate and fluid at dispenser 28 to create a spray and can enhance mixing of the constituent materials to provide a higher quality plural component material. Air source 19 can be a source of pressurized air, such that a pump is not required for air to flow from air source 19, through air line 23 and to dispenser 28. Additionally and/or alternatively, one or more pumps and/or compressors can be disposed in air source 19 or along air line 23 to pressure air flowing to dispenser 28. For example, air source 19 can be a pressurized tank or an air compressor, among other options.

As referred to herein, “air” or “nucleation air” can refer to any suitable inert gas or combination of inert gases for aerating a plural component mixture with a dispenser or nozzle assembly disclosed herein. For example, the air can include one or more of $N_2$, $O_2$, $CO_2$, or a noble gas, among other options. As a specific example, the air or nucleation air can be entirely $N_2$, $O_2$, or $CO_2$, or can include a combination of $N_2$, $O_2$, and $CO_2$. In yet further examples, the air can be an atmospheric air.

Dispenser 28 is configured to receive the multiple constituent materials and the air, and further mix the constituent materials with the air to form the plural component material. The plural component material formed by dispenser 28 can be, for example, an aerated plural component material. Dispenser 28 can be of any desired configuration for applying the multiple component material. In some examples, dispenser 28 can be an automatic dispenser configured to dispense the plural component material, such as a dispenser 28 mounted on a serial robot arm or other type of position manipulator.

Controller 16 is operatively connected, electrically and/or communicatively, to other components of plural component dispense system 10. In the example shown, controller 16 is operatively connected at least to pump drive 14, air source 19, and dispenser 28, among other components. Controller 16 is configured to control operation of one or more of the various components, provide operating instructions to one or more of the various components, and/or receive information from one or more of the various components. Controller 16 is configured to store software, implement functionality, and/or process instructions. The controller 16 can include memory 44 and control circuitry 46 configured to implement functionality and/or process instructions. For example, the control circuitry 46 can be capable of processing instructions stored in the memory 44. Examples of the control circuitry 46 can include one or more of a processor, a microprocessor, a controller, a digital signal processor (DSP), an application specific integrated circuit (ASIC), a field-programmable gate array (FPGA), or other equivalent discrete or integrated logic circuitry. The controller 16 can be of any suitable configuration for gathering data, processing data, etc. The controller 16 can receive inputs, provide outputs, generate commands for controlling operation of components of plural component dispense system 10, etc. The controller 16 can include hardware, firmware, and/or stored software. The controller 16 can be entirely or partially mounted on one or more circuit boards. The controller 16 can be configured to receive inputs and/or provide outputs via user interface 48.

User interface 48 can be any graphical and/or mechanical interface that enables user interaction with controller 16. For example, user interface 48 can implement a graphical user interface displayed at a display device of user interface 48 for presenting information to and/or receiving input from a user. User interface 48 can include graphical navigation and control elements, such as graphical buttons or other graphical control elements presented at the display device. User interface 48, in some examples, includes physical navigation and control elements, such as physically actuated buttons or other physical navigation and control elements. In general, user interface 48 can include any input and/or output devices and control elements that can enable user interaction with controller 16.

Memory 44 can be configured to store data and information before, during, and/or after operation. The memory 44, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the memory 44 is a temporary memory, meaning that a primary purpose of the memory 44 is not long-term storage. The memory 44, in some examples, is described as volatile memory, meaning that the memory 44 does not maintain stored contents when power to controller 16 is turned off. Examples of volatile memories can include random access memories (RAM), dynamic random access memories (DRAM), static random access memories (SRAM), and other forms of volatile memories. In some examples, the memory 44 is used to store program instructions for execution by the control circuitry 46. The memory 44, in one example, is used by software or applications running on controller 16 to temporarily store information during program execution. The memory 44, in some examples, also includes one or more computer-readable storage media. The memory 44 can be configured to store larger amounts of information than volatile memory. The memory 44 can further be configured for long-term storage of information. In some examples, the memory 44 includes non-volatile storage elements. Examples of such non-volatile storage elements can include magnetic hard discs, optical discs, flash memories, or forms of electrically programmable memories (EPROM) or electrically erasable and programmable (EEPROM) memories.

Controller 16 is operatively associated with material pumps 12*a*, 12*b* to control the material outputs of material pumps 12*a*, 12*b*. For example, controller 16 can provide a command to pump drive 14 to control the reciprocation speed of the fluid displacers 40*a*, 40*b* of material pumps 12*a*, 12*b*. Where plural component dispense system 10 includes one or more valves along output lines 22*a*, 22*b*, controller 16 can also be operatively connected to those valves to control their operation. Similarly, where plural component dispense system 10 includes one or more pumps at air source 19 or along air line 23, controller 16 can be operatively connected to those pumps to control their operation.

Plural component dispense system 10 advantageously can dispense multiple different forms of plural component materials by feeding different constituent materials to plural component dispense system 10 and can create aerated plural component materials by mixing air from air source 19 with different constituent materials. Notably, as air from air source 19 can be both used to create a plural component plural component material and to accelerate fluids within dispenser 28 for spraying the aerated plural component material, material pumps 12*a*, 12*b* can be configured to operate at lower pressures than pumps of systems that use the pressure of material flowing through output lines 22*a*, 22*b* to generate a spray. Similarly, mixing of air and the component materials can occur at relatively low pressures, meaning that plural component dispense system 10 does not require specialized components for mixing air with one or more high-pressure component materials. Further, as mixing of air and the plural component materials occurs at dispenser 28 rather than a point upstream of dispenser 28, plural component dispense system 10 does not require specialized components to aerate the component materials upstream of dispenser 28. Accordingly, plural component dispense system 10 is simpler and less expensive than other systems for creating aerated plural component materials.

While foam is used herein as an exemplar, it is understood that the resultant plural component can be an insulator, such as foam, or can be paint, sealant, coating, adhesive, etc. In some examples, plural component dispense system 10 is configured to combine a first component material, such as a resin (e.g., polyol resin), and a second component material, such as a catalyst (e.g., isocyanate), that combine to form a spray foam. While plural component dispense system 10 is shown and described as a system that combines two component materials to form the plural component material, it is understood that plural component dispense system 10 can be configured to combine more than two component materials to form the plural component material.

Figure 2:
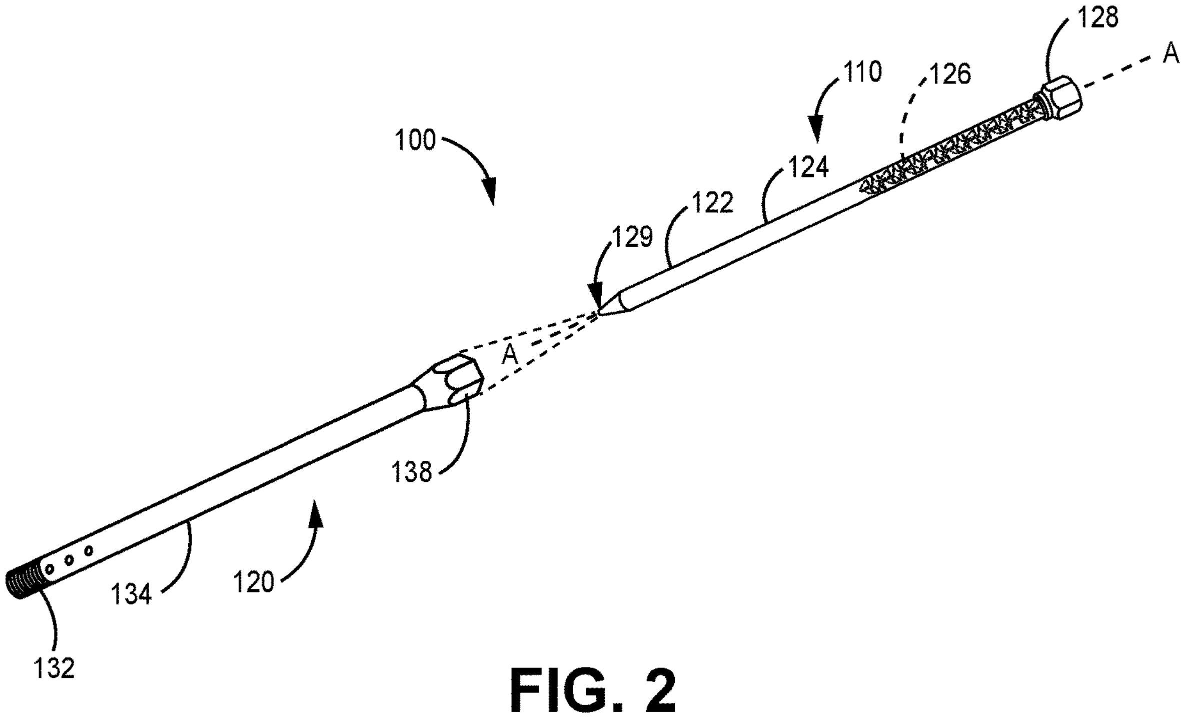
FIG. 2 is an exploded view of an example of a dispensing assembly.
Figure 3:
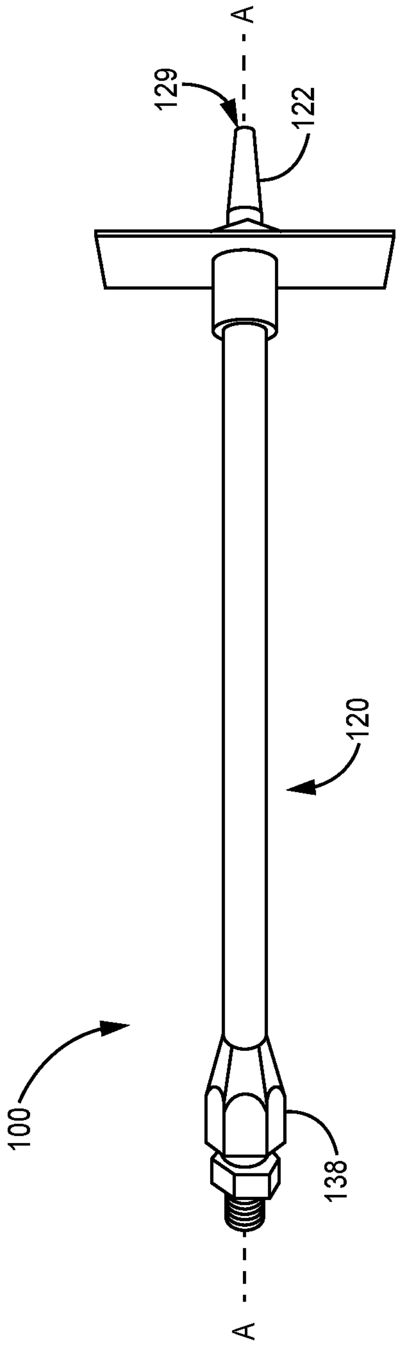
FIG. 3 is an isometric view of the dispensing assembly of FIG. 2

FIG. 2 is an exploded isometric view of dispensing assembly 100, which is a spray dispenser suitable for use as dispenser 28 in plural component dispense system 10. FIG. 3 is a perspective view of dispensing assembly 100 assembled together. FIGS. 2 and 3 will be discussed together herein. In the depicted example, dispensing assembly 100 includes mixing channel 110 and shroud 120. Mixing channel 110 includes tip portion 122, channel housing 124, mixer 126, inlet portion 128, and tip orifice 129. Shroud 120 includes outlet attachment portion 132, shroud housing 134, and inlet attachment portion 138.

Mixing channel 110 is hollow and extends along axis A-A. The hollow structure of mixing channel 110 allows component materials (e.g., from material supplies 18*a*, 18*b* of plural component dispense system 10; FIG. 1) to flow through mixing channel 110. Channel housing 124 is generally cylindrical and defines a flow passage that extends along axis A-A through the interior of mixing channel 110. Tip portion 122 is formed in a terminal portion of channel housing 124 and includes tip orifice 129, which is located at the downstream end of tip portion 122 and is configured to spray material from the flow passage defined by channel housing 124. In some examples, tip orifice 129 may be referred to as a "nozzle orifice." In the depicted example, tip portion 122 tapers in a downstream direction to narrow a width of the flow passage through mixing channel 110. In other examples, tip portion 122 does not taper. Inlet portion 128 is formed in the terminal portion of channel housing 124 opposite tip portion 122 along axis A-A, and is configured to receive component materials from one or more material sources and/or from a fluid manifold fluidly connected to inlet portion 128. For example, inlet portion 128 can be fluidly connected to output lines 22*a*, 22*b* to receive materials from material supplies 18*a*, 18*b* of plural component dispense system 10 (FIG. 1).

Mixer 126 is disposed within the flow space defined by channel housing 124 and functions to mix component materials prior to spraying through tip orifice 129 in tip portion 122. In the depicted example, mixer 126 is a static mixer, such that mixer 126 has a static position and does not require moving components to provide continuous mixing of component materials flowing through mixer 126. Rather, mixer 126 defines one or more helical passageways through the flow space defined by channel housing 124 that agitate and thereby mix component materials as those component materials flow through mixer 126. The helical passageways defined by mixer 126 extend along a helical axis that is coaxial with axis A-A and is parallel to the flow direction through channel housing 124. In other examples, mixer 126 can be a static mixer having a different geometry that causes mixing of component materials. In yet further examples, mixer 126 can be a dynamic mixer having one or more moving parts that cause mixing of component materials.

In operation, component materials are received by inlet portion 128, which defines an upstream end of mixing channel 110. Component materials received at inlet portion 128 then pass through mixer 126 and are mixed to form a plural component material. Mixer 126 does not extend through the entire length of mixing channel 110. Rather, the axially downstream end of mixer 126, located closest to tip orifice 129, is located upstream of tip portion 122 and tip orifice 129. The plural component material then flows downstream to tip portion 122, which defines the downstream end of mixing channel 110, and is sprayed through tip orifice 129. A human operator can grasp and position mixing channel 110 to apply the material sprayed by mixing channel 110. Additionally and/or alternatively, a serial robot arm or other type of position manipulator can be used to position mixing channel 110 to apply the sprayed plural component material. In some examples, one or more valve elements can be interposed within and/or upstream of mixing channel 110 to selectively allow flow of component materials through mixing channel 110, and thereby allow for selective application of the plural component material by mixing channel 110. The one or more valve elements can be actuated by, for example, a trigger operatively connected to the one or more valve elements.

Shroud 120 is disposed around mixing channel 110 and receives at least a portion of mixing channel 110. Should 120 can structurally support mixing channel 110. Shroud 120 can facilitate the connection of dispensing assembly 100 to various components. Shroud housing 134 is generally cylindrical and is also hollow, such that mixing channel 110 can be disposed within shroud housing 134, as is depicted in FIG. 3. In some examples, the inner diameter of the cylindrical portion of shroud housing 134 is substantially the same as the outer diameter of the cylindrical portion of channel housing 124, such that the outer surface of channel housing 124 of mixing channel 116 contacts the inner surface of shroud housing 134 of shroud 120.

Inlet attachment portion 138 is formed at the upstream end of shroud housing 134 and outlet attachment portion 132 is formed at the downstream end of shroud housing 134. Inlet attachment portion 138 can allow dispensing assembly 100 to connect to a fluid manifold or other components for providing component material to inlet portion 128 of mixing channel 110. For example, inlet attachment portion 138 can allow dispensing assembly 100 to be adapted to fluidly connect with output lines 22*a*, 22*b* of plural component dispense system 10 (FIG. 1). Dispensing assembly 100 can form a portion of the dispenser 28 and can connect to a body of the dispenser 28. Outlet attachment portion 132 can allow dispensing assembly 100 to be adapted to various nozzles that fluidly connect to tip orifice 129 in tip portion 122 of mixing channel 110. The nozzles fluidly connected to tip orifice 129 can be used to provide a different spray pattern than the pattern provided by tip orifice 129 and tip portion 129.

Inlet attachment portion 138 and outlet attachment portion 132 can each have one or more types of connectors for connecting and/or attaching to other components. For example, inlet attachment portion 138 and/or outlet attachment portion 132 can be attached to other components by a screw attachment, a bayonet attachment, interference fit attachment, or a sleeve connector, among other options. In the example shown, inlet attachment portion 138 includes interior threading configured to mate with exterior threads on another component. In the example shown, outlet attachment portion 132 includes exterior threading configured to mate with interior threads on another component. Attaching components to inlet attachment portion 138 and outlet attachment portion 132 rather than directly to inlet portion 128 and tip portion 122 can improve the strength of seals between mixing channel 110 and those components, thereby reducing the incidence of leaks and maintaining adequate fluid pressure for spray application. In some examples, inlet portion attachment 138 and/or outlet attachment portion 132 can include additional seal elements to further improve sealing between dispensing assembly 100 and any upstream and/or downstream components.

Further, mixing channel 110 can clog during use, such as due to the component materials reacting and curing when mixed. When mixing channel 110 clogs, dispensing assembly 100 can be removed from shroud 120 and the clogged mixing channel 110 can be replaced with a new, unclogged mixing channel 110 of the same or a different configuration as the mixing channel 110 just removed. Dispensing assembly 100 can then be reassembled and plural component material application can be resumed without requiring significant downtime of the spray system. Forming mixing channel 110 as a replaceable component also allows mixing channel 110 to be formed of a polymer material or another relatively inexpensive material. Shroud 120 can be formed of a more resilient material (e.g., metal such as steel) than mixing channel 110 that is tolerant of the pressures of the plural component materials flowing through, received by, and sprayed by dispensing assembly 100. Shroud 120 can thereby structurally support mixing channel 110, thereby allowing mixing channel 110 to be formed of a less expensive material that may be susceptible to pressure-induced deformation.

FIGS. 4-16 show various embodiments of spray dispenser assemblies that include mixing channel 110 and introduce air to the plural component material downstream of mixer 126. Specifically, the dispenser assemblies shown in FIGS.

4-16 introduce air from an external air source and include one or more air lines and/or air passages that flow the air from a point external to mixing channel 110 to a flow of plural component material flowing through mixing channel 110. The embodiments shown in FIGS. 4-16 flow air through and/or around channel housing 124 of mixing channel 110. The air introduced by the air passages shown in FIGS. 4-16 is nucleation air that aerates the plural component material and enhances mixing of the component materials into the aerated plural component material. The aerated plural component material can then be applied by spraying through tip orifice 129 of mixing channel 110. As will be explained in more detail subsequently, the nucleation air introduced by the air passages described in FIGS. 4-16 is introduced at outlets disposed downstream of mixer 126, such that the point at which air is introduced does not radially overlap with mixer 126. Components can be considered to radially overlap when the components are disposed at a common location along axis A-A such that a radial line extending orthogonally from axis A-A passes through each of those radially overlapping components. Introducing air downstream of mixer 126 in mixing channel 110 produces aerated plural component materials having more desirable foam characteristics than existing systems that introduce air upstream of mixer 126 and/or upstream of the spray dispenser at another point in a dispensing system. By locating the air outlet downstream of mixer 126 such that air is introduced to the plural component material downstream of mixer 126, the embodiments shown in FIGS. 4-16 introduce air into a plural component material that is fully or substantially mixed rather than into a partially mixed plural component material or into unmixed component materials, and thereby produce aerated plural component material having improved foam characteristics as compared to existing systems. The improved foam characteristics provided by the embodiments disclosed herein include foams with reduced cell size, improved cell density, and improved cell uniformity, among other characteristics.

The systems shown in FIGS. 4-16 provide a number of additional advantages. Introducing air into the flow space defined by housing 124 of mixing channel 110 allows for the production of an aerated plural component material by aerating the plural component material rather than be aerating a component material of the plural component material. Notably, specialized and/or complex components are often required to aerate a component material upstream of a mixer in a plural component dispensing system and also to mix an aerated component material into a non-aerated component material to produce an aerated plural component material. Accordingly, the embodiments shown in FIGS. 4-16 advantageously allow for simpler plural component dispensing systems to be used to create and dispense aerated plural component materials than existing systems. Further, the embodiments shown in FIGS. 4-16 allows for aeration of plural component materials into aerated plural component materials using lower pressure air than existing systems. Specifically, the introduction of aeration air into a mixed plural component material downstream of mixer 126 in mixing channel 110 requires lower pressure air to create aerated plural component mixtures having desirable foam qualities than existing systems. In some examples, the embodiments shown in FIGS. 4-16 can use air having a pressure of about 30-100 pounds per square inch (“psi”) (about 0.2 megapascal (MPa) to about 0.69 MPa) to produce high-quality foam. In further examples, air having a pressure of about 80-100 psi (about 0.55 MPa to about 0.69 MPa) can be used to produce high-quality foam. Advantageously, it is less expensive and requires less complex equipment to produce air in the ranges used by the dispenser assemblies of FIGS. 4-16 than the air used by existing spray foam systems.

The nucleation air can be flowed into the plural component material in an upstream direction (i.e., away from tip orifice 129 and toward inlet portion 128 along axis A-A), though it is understood that not all examples are so limited. Flowing nucleation air in an upstream direction can advantageously create aerated plural component materials having improved foam characteristics as compared to materials aerated by air directed in a downstream direction or in a direction transverse to axis A-A. In further examples, dispensing assembly 100 can produce high quality foam when nucleation air is emitted into the flow space defined by housing 124 within a threshold range of angles relative to axis A-A.

The nucleation air used by the dispenser assemblies of FIGS. 4-16 can be any inert gas or combination of inert gases. For example, the air can include one or more of $N_2$, $O_2$, $CO_2$, or a noble gas, among other options. As a specific example, the air or nucleation air can be entirely $N_2$, $O_2$, or $CO_2$, or can include a combination of $N_2$, $O_2$, and $CO_2$. In yet further examples, the air can be an atmospheric air.

Figure 4:
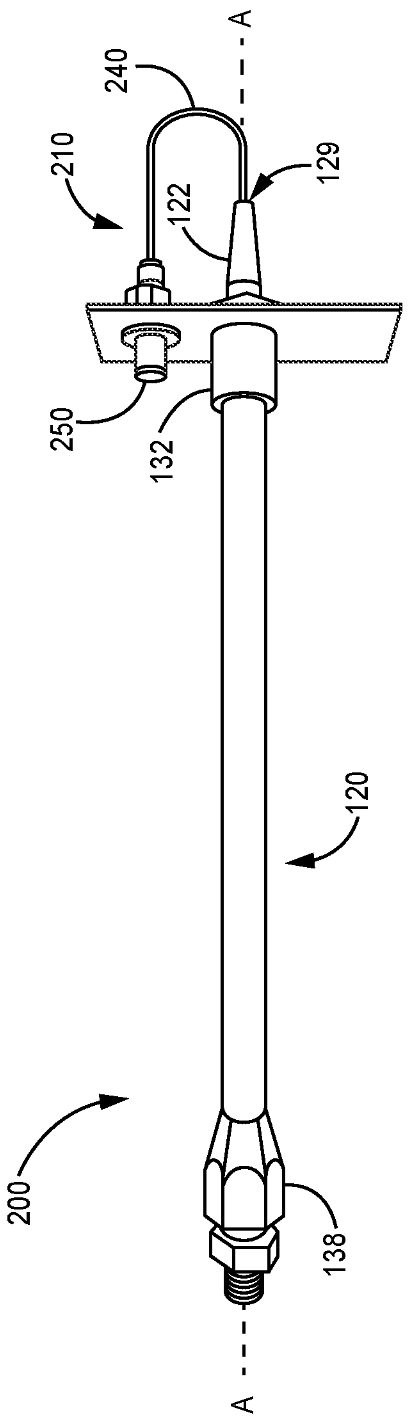
FIG. 4 is an isometric view of another example of a dispensing assembly.
Figure 5:
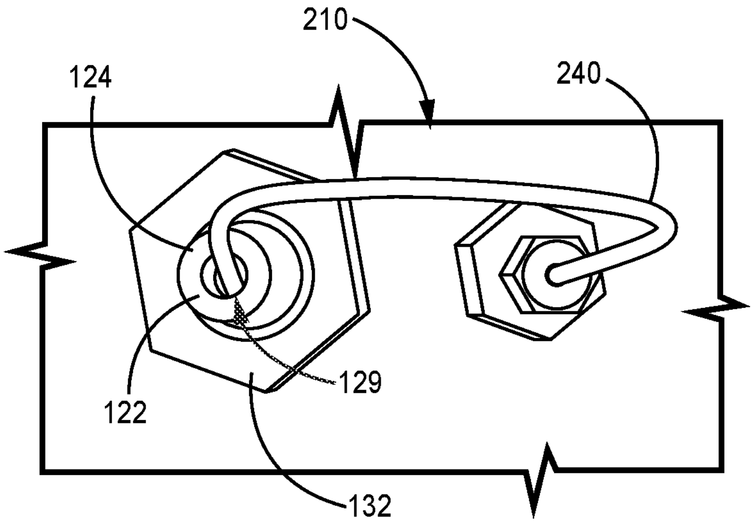
FIG. 5 is another perspective view of the example of a dispensing assembly of FIG. 4.
Figure 6:
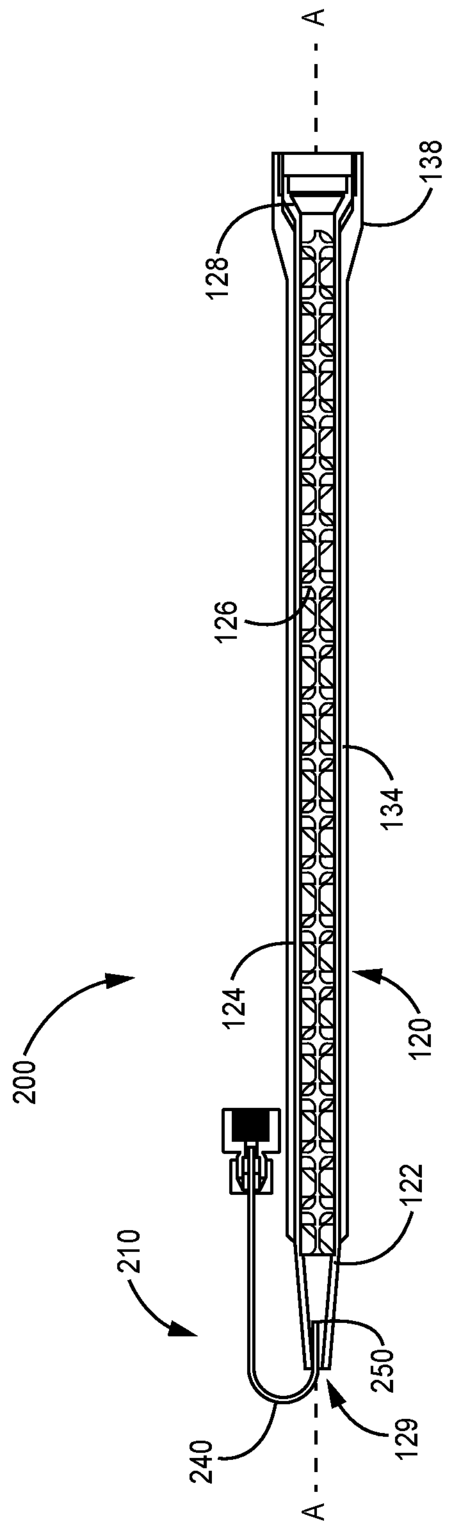
FIG. 6 is a cross-sectional view of the example of a dispensing assembly of FIGS. 4-5 taken along axis A-A.

FIGS. 4-6 show dispensing assembly 200, which includes mixing channel 110 and aerator 210. Dispensing assembly 200 is substantially similar to dispensing assembly 100 in that nucleating air is introduced to the plural component material upstream of tip orifice 129 and downstream of mixer 126. Aerator 210 includes air line 240, air outlet 250 and air inlet 260. Aerator 210 is configured to introduce nucleation air into plural component material downstream of mixer 126 to form aerated plural component material FIGS. 4-6 will be discussed together. FIG. 4 is an isometric view of dispensing assembly 200 and shows mixing channel 110, shroud 120, tip portion 122, tip orifice 129, inlet attachment portion 138, aerator 210, air line 240, and axis A-A. FIG. 5 is an isometric end view of dispensing assembly and shows and depicts mixing channel 110, tip portion 122, outlet attachment portion 132 of shroud 120, aerator 210, and air line 240. FIG. 6 is a cross-sectional view of dispensing assembly 200 taken along axis A-A and shows mixing channel 110, tip portion 122, shroud 120, channel housing 124, mixer 126, inlet portion 128, tip orifice 129, shroud housing 134, inlet attachment portion 138, aerator 210, air line 240, air outlet 250, and air inlet 260.

As shown in FIGS. 4-6, air line 240 of aerator 210 receives nucleation air from air inlet 260 and flows the air into the inner flow space defined within mixing channel 110 to aerate the plural component material. More specifically, air line 240 defines an internal air passage that can flow air from air inlet 260 to air outlet 250. Air line 240 is non-linear and has a “U” shape that allow air line 240 to extend around tip portion 122 and into the inner flow space of mixing channel 110 through tip orifice 129. Air line 240 extends in an upstream direction through tip portion 122 and terminates at air outlet 250, which is configured to emit air in an upstream direction through mixing channel 110. The shape of air line 240 allows air line 240 to turn the flow of air accepted at air inlet 260. In the depicted example, air line 240 accepts air flowing into air inlet 260 in a first direction and turns the flow of air to flow in a second direction opposite the first before the air is emitted by air outlet 250. While air line 240 is depicted in FIGS. 4-6 as extending only partway through tip portion 122, in other examples air line 240 can extend to any suitable point within mixing channel 110 downstream of mixer 126. Air inlet 260 can be connected to and receive air from any suitable source of air for aerating the plural component material. For example, air inlet 260 can be configured to receive nucleation air from air source 19. Air outlet 250 is depicted as aligned with axis A-A, but in other examples air outlet 250 can be radially offset from axis A-A. Air outlet 250 can be oriented to emit air in a direction coaxial with axis A-A or in a direction parallel but not coaxial with axis A-A.

While air line 240 and air outlet 250 are described herein as emitting air in a generally upstream direction, in some examples air line 240 and air outlet 250 can be positioned to inject air in a direction transverse to the direction of flow through mixing channel 110 or in a downstream direction. For example, air line 240 and air outlet 250 can be positioned and configured to flow air in a direction that is transverse or perpendicular to axis A-A, or parallel and/or coaxial with axis A-A and in a downstream direction. In these examples, air line 240 can still adopt a "U" shape and air outlet 250 can be repositioned based on the desired direction of air flow into the flow of plural component material.

Figure 7:
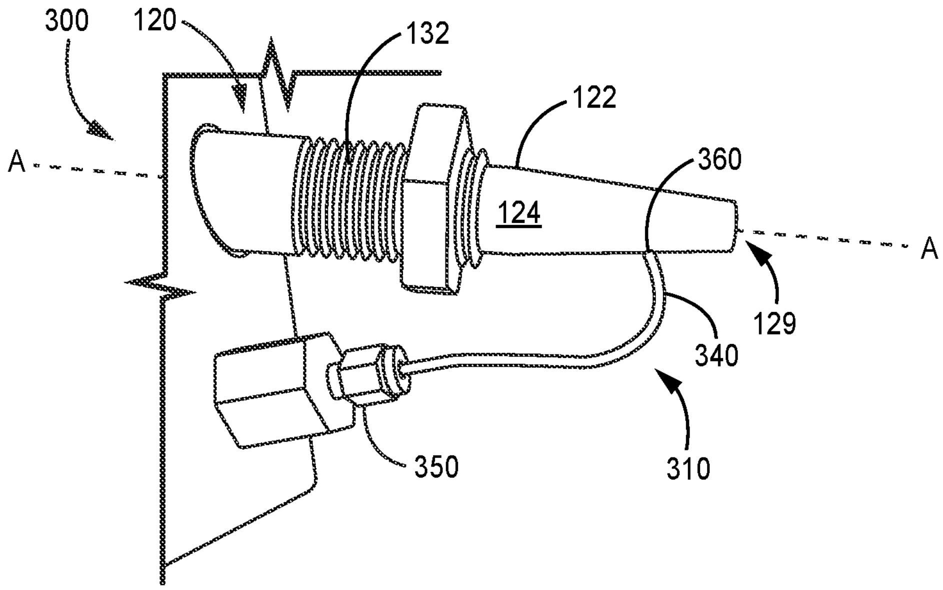
FIG. 7 is an isometric view of a further example of a dispensing assembly.
Figure 8:
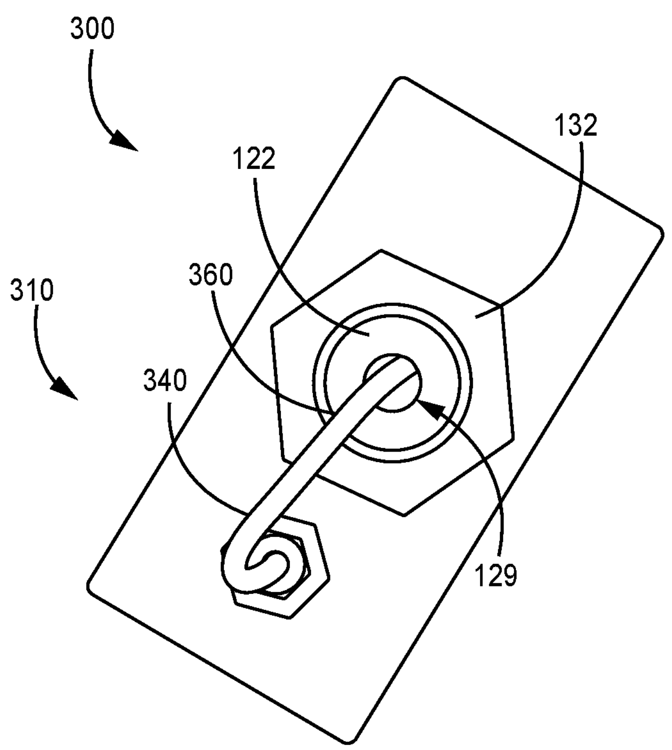
FIG. 8 is another isometric view of the example of a dispensing assembly of FIG. 6.
Figure 9:
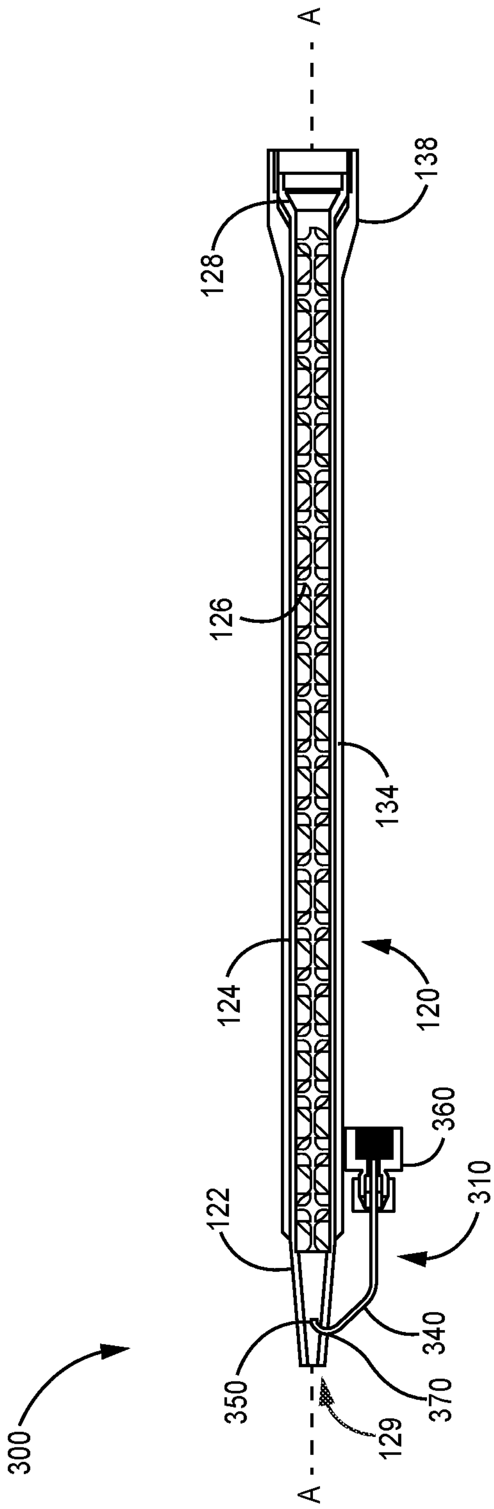
FIG. 9 is a cross-sectional view of the example of a dispensing assembly of FIGS. 7-8 taken along axis A-A.

FIGS. 7-9 are perspective views of dispensing assembly 300, which includes mixing channel 110 and aerator 310. Dispensing assembly 300 is substantially similar to dispensing assembly 100 and dispensing assembly 200 in that nucleating air is introduced to the plural component material upstream of tip orifice 129 and downstream of mixer 126. Aerator 310 includes air line 340, air inlet 360, and extends through tip portion 122 of mixing channel 110 at interface 370. FIGS. 7-9 will be discussed together herein. Like aerator 210, aerator 310 is also configured to introduce nucleation air into plural component material downstream of mixer 126 to form aerated plural component material.

FIG. 7 is an isometric view of dispensing assembly 300 and depicts shroud 120, tip portion 122 of mixing channel 110, tip orifice 129, outlet attachment portion 132, aerator 310, air line 340, air inlet 360, interface 370, and axis A-A.

FIG. 8 is an isometric end view of dispensing assembly 300 that depicts tip portion 122, tip orifice 129, outlet attachment portion 132, aerator 310, air line 340, and interface 370.

FIG. 9 is a cross-sectional view of dispensing assembly 300 taken along axis A-A and shows mixing channel 110, tip portion 122, shroud 120, channel housing 124, mixer 126, inlet portion 128, tip orifice 129, shroud housing 134, inlet attachment portion 138, aerator 310, air line 340, air outlet 350, air inlet 360, and interface 370.

Similar to the arrangement described previously with respect to air line 240, air outlet 250, and air inlet 260, air line 340 receives nucleation air from air inlet 360 and flows the nucleation air to air outlet 350, which emits the nucleation air within tip portion 122 of mixing channel 110 to aerate plural component material into aerated plural component material. More specifically, air line 340 defines an internal air passage that can flow air from air inlet 360 to air outlet 350. Air line 340 is non-linear and has a "J" shape. In the examples shown, air line 340 extends through channel housing 124 at tip portion 122 and flows air in an upstream direction (i.e., away from tip orifice 129) and into mixing channel 110. Air line 340 extends through the wall of tip portion 122 and into the interior of tip portion 122. Air line 340 extends through the wall of tip potion 122 at a location upstream of tip orifice 129. In other examples, air line 340 can be formed as a linear channel and air outlet 360 can be positioned to inject air in an upstream direction through mixing channel 110.

Where air line 340 extends through channel housing 124, air line 340 forms interface 370 between air line 340 and channel housing 124. Air line 340 forms a seal with channel housing 124 at interface 370, such that fluid (e.g., plural component material, air, etc.) does not flow through interface 370 during operation of dispensing assembly 300. Air line 340 is configured to emit air in an upstream direction into plural component material flowing downstream through the interior of mixing channel 110. Air inlet 360 can be connected to and receive air from any suitable source of air for injecting the nucleating air into the plural component material. For example, air inlet 360 can be configured to receive nucleation air from air source 19 (FIG. 1). Further, while air line 340 is depicted in FIGS. 6 and 7 as extending into mixing channel 110 through tip portion 122, in other examples air line 240 can extend through any suitable point of mixing channel 110 downstream of mixer 126.

The shape of air line 340 allows air line 340 to turn the flow of air accepted at air inlet 360 to flow in a different direction at air outlet 350. In the depicted example, air line 340 accepts air flowing into air inlet 360 in a first direction and turns the flow of air to flow in a second direction opposite the first before the air is emitted by air outlet 350. Air outlet 350 is depicted as aligned with axis A-A in FIGS. 7-9, but in other examples air outlet 350 can be radially offset from axis A-A. Air outlet 350 can be oriented to emit air in a direction coaxial with axis A-A or in a direction parallel but not coaxial with axis A-A.

While air line 340 and air outlet 350 are described herein as emitting air in a generally upstream direction, in some examples air line 340 and air outlet 350 can be positioned to inject air in a direction transverse to the direction of flow through mixing channel 110 or in a downstream direction. For example, air line 340 and air outlet 350 can be positioned and configured to flow air in a direction that is transverse or perpendicular to axis A-A, or parallel and/or coaxial with axis A-A and in a downstream direction. In these examples, air line 340 can still adopt a "J" shape and air outlet 350 can be repositioned based on the desired direction of air flow into the flow of plural component material.

Figure 10:
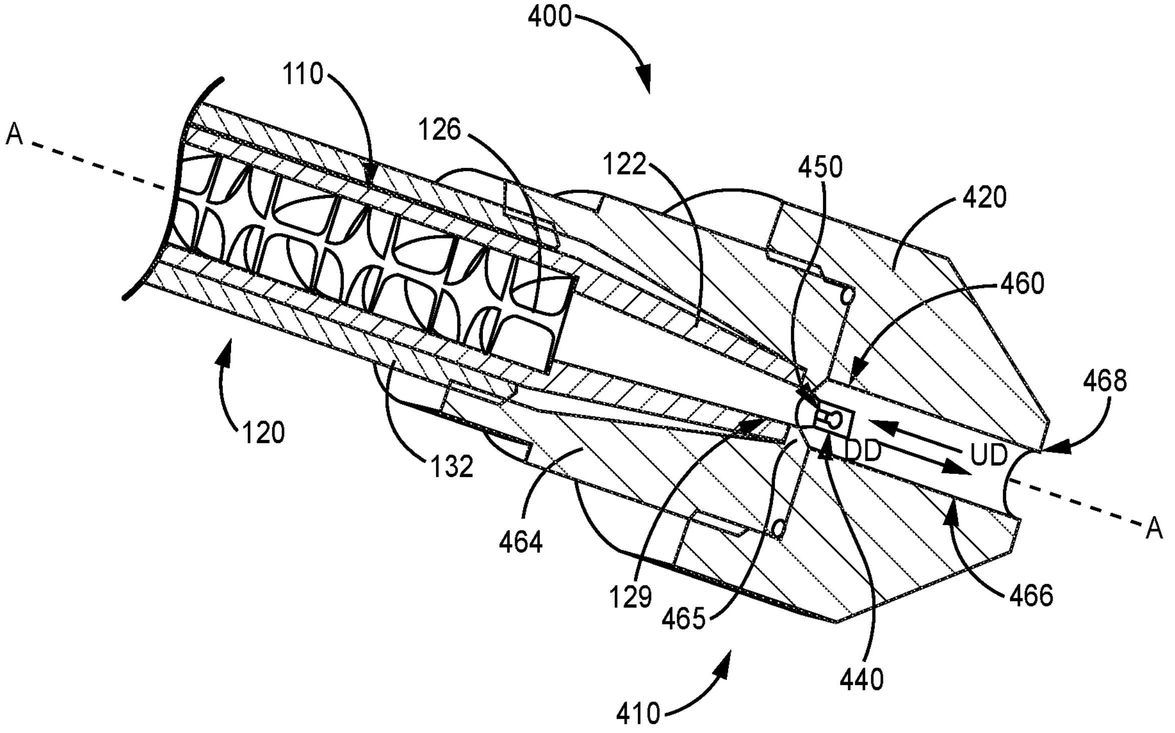
FIG. 10 is a cross-sectional view of yet a further example of a dispensing assembly taken along axis A-A.
Figure 11:
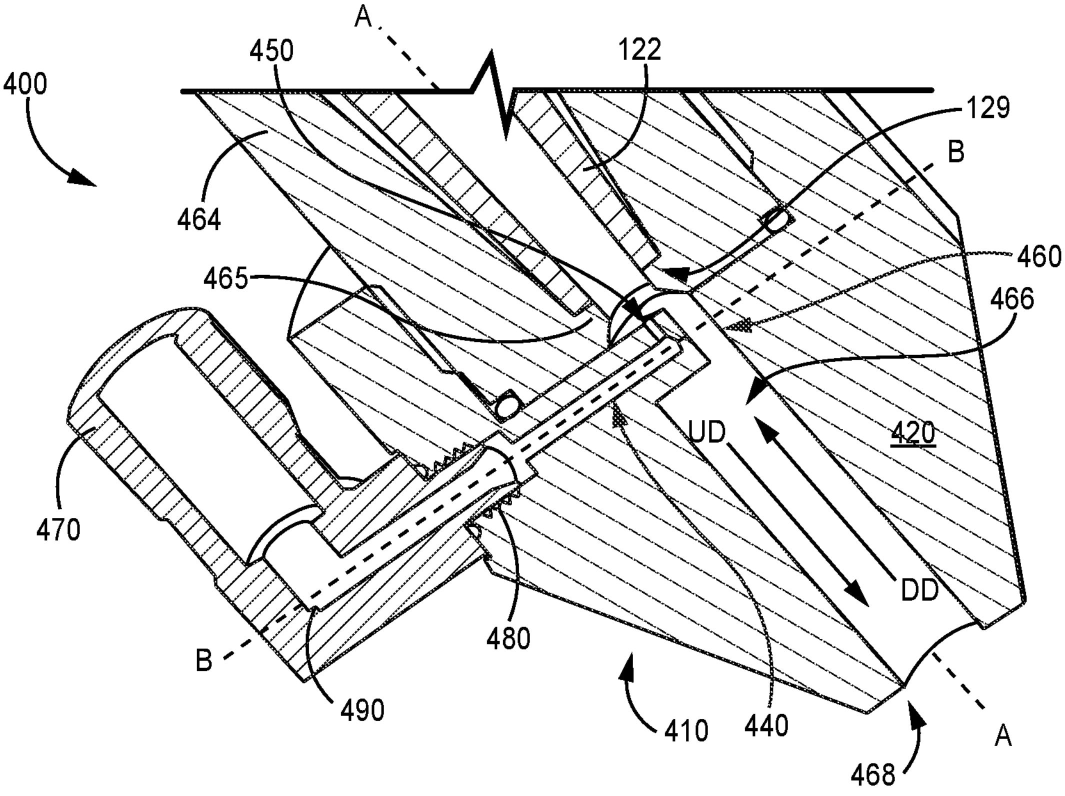
FIG. 11 is another cross-sectional view of the example of a dispensing assembly of FIG. 8 taken along axis A-A.
Figure 12:
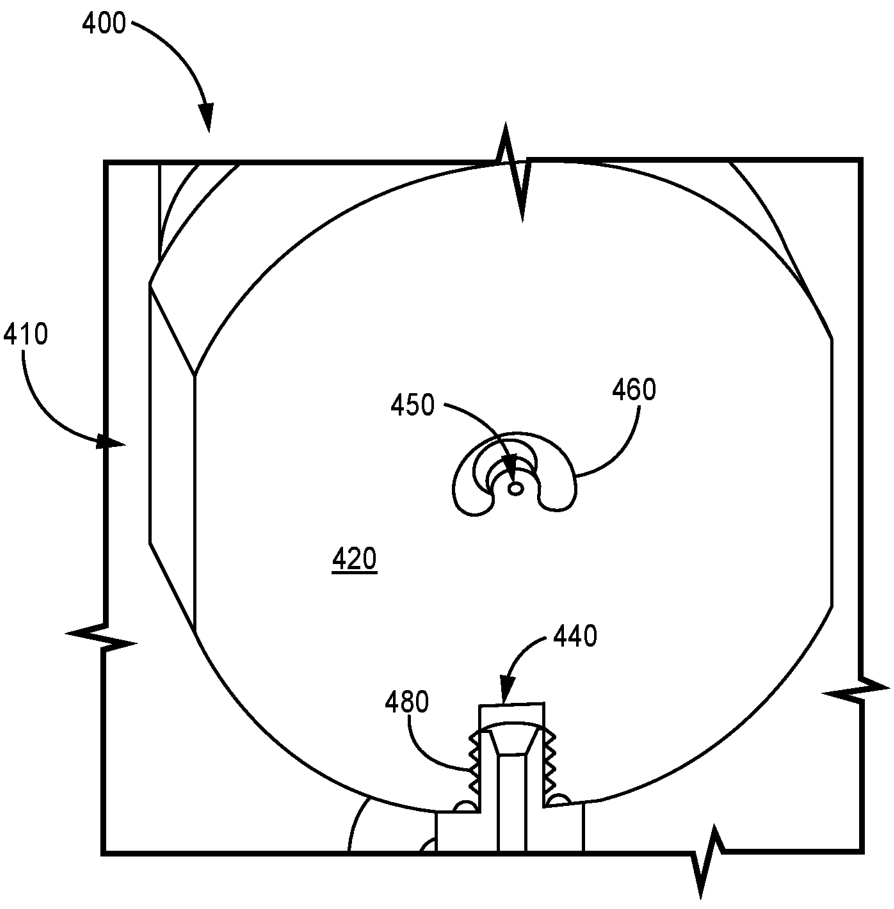
FIG. 12 is a cross-sectional view of the example of a dispensing assembly of FIGS. 10 and 11 taken along axis B-B.

FIGS. 10-12 depict dispensing assembly 400, which includes mixing channel 110, shroud 120, and aerator 410. Dispensing assembly 400 is substantially similar to dispensing assembly 100, dispensing assembly 200, and dispensing assembly 300 in that nucleating air is introduced to the plural component material upstream of an outlet that emits the plural component material from the dispenser and downstream of mixer 126. Aerator 410 includes spray head 420, air passage 440, air outlet 450, flow inlet 460, attachment portion 464, outlet passage 466, spray outlet 468, air inlet 470, and screw attachment 480. Air inlet 470 includes elbow 490.

FIG. 10 is a cross-sectional view of dispensing assembly 400 taken along axis A-A and depicts mixing channel 110, shroud 120, tip portion 122, mixer 126, tip orifice 129, outlet attachment portion 132, aerator 410, air passage 440, air outlet 450, flow inlet 460, attachment portion 464, sealing flange 465, outlet passage 466, spray outlet 468, axis A-A, upstream direction UD, and downstream direction DD.

FIG. 11 is another cross-sectional view of dispensing assembly 400 taken along axis A-A that illustrates further components of aerator 410. FIG. 11 depicts tip portion 122, tip orifice 129, aerator 410, air passage 440, air outlet 450, flow inlet 460, attachment portion 464, outlet passage 466, spray outlet 468, air inlet 470, screw attachment 480, elbow 490, axis A-A, upstream direction UD, and downstream direction DD.

FIG. 12 is a cross-sectional view of dispensing assembly 400 taken in a plane along axis B-B perpendicular to axis A-A that illustrates the partially-concentric arrangement of flow inlet 460 and air outlet 450. FIG. 12 depicts aerator 410, air passage 440, air outlet 450, flow inlet 460, and screw attachment 480. FIGS. 10-12 will be discussed together herein.

Aerator 410 is an attachment that can be affixed at the downstream end of mixing channel 110 by connecting to, for example, outlet attachment portion 132 of shroud 120. Like aerators 210 and 310, aerator 410 is configured introduce nucleation air into plural component material downstream of mixer 126 to form aerated plural component material. Aerator 410 can be used to inject air into a flow of plural component material to aerate the plural component material. In the example shown, aerator 410 is configured to inject the air in upstream direction UD against the flow of the plural component material through aerator 410. Upstream direction UD and downstream directions DD are shown as arrows indicating the direction of upstream and downstream flow, respectively, in FIGS. 11-12. Fluid flows through dispensing assembly 400 in upstream direction UD when it flows away from spray outlet 468 and toward mixer 126. Fluid flows through dispensing assembly 400 in downstream direction DD when it flows away from mixer 126 and toward spray outlet 468. Downstream direction DD and upstream direction UD define flow directions that are generally parallel with axis A-A, though all examples may not be so limited.

In the depicted embodiment, nucleation air is flowed through air passage 440 to air outlet 450 and from air outlet 450 in an upstream direction towards tip orifice 129. In some examples, air passage 440 and air outlet 450 deliver air into the inner space of tip portion 122 of mixing channel 110. In some examples, the sections of spray head 420 defining the flow path of air toward tip orifice 129 (e.g., air passage 440, air outlet 450, and/or air inlet 460) can be referred to as an "air line." The nucleation air aerates the plural component material mixed by mixer 126 that flows generally in downstream direction DD and through flow inlet 460 into outlet passage 466. The aerated plural component material flows downstream through outlet passage 466 to spray outlet 468, which is configured to emit a spray of the aerated plural component material. In the depicted example, outlet passage 466 is generally cylindrical and spray outlet 468 is a circular orifice, but in other examples, outlet passage 466 and spray outlet 468 can adopt different shapes for creating a suitable spray of plural component material.

Flow inlet 460 is depicted as having a smaller cross-sectional area (as taken in a plane orthogonal to axis A-A) than the cross-sectional are of tip orifice 129 (as taken in a plane orthogonal to axis A-A) or the cross-sectional area of outlet passage 466 (as taken in a plane orthogonal to axis A-A). This depicted configuration of flow inlet 460, tip orifice 129, and outlet passage 466 can increase fluid turbulence through flow inlet 460, causing increased mixing of plural component materials that can increase the homogeneity of the aerated plural component material emitted by spray outlet 468. In other examples, flow inlet 460, tip orifice 129, and outlet passage 466 can adopt different relative sizes and cross-sectional areas.

Spray head 420 is configured to produce and spray aerated plural component. Spray head 420 includes air passage 440, air outlet 450, flow inlet 460, outlet passage 466, spray outlet 468, and screw attachment 480. Aerator 410 is attached to inlet attachment portion 138 of shroud 120 by attachment portion 464. Attachment portion 464 at least partially circumferentially surrounds tip portion 122 and includes sealing flange 465, which forms a seal against tip portion 122. In the depicted example, sealing flange 465 forms a seal with an axial end face of tip portion 122, but in other examples other seal configurations are possible. Attachment portion 464 and spray head 420 are depicted in FIGS. 10-11 as separate components, but in other examples, attachment portion 464 and spray head 420 can be formed as a single, integral component.

Generally, attachment portion 464 is configured such that when aerator 410 is attached to mixing channel 110/shroud 120, tip portion 122 is sealed against sealing flange 465 to reduce or prevent a flow of fluid backward through the interface between the exterior of tip portion 122 and the interior of attachment portion 464, thereby maintaining the pressure of plural component material as it is aerated in tip portion 122 and subsequently flowed downstream to flow inlet 460. Air outlet 450 is positioned downstream of tip orifice 129 and is configured to inject air into the plural component material emitted from tip orifice 129. Air outlet 450 is depicted as aligned with axis A-A in FIGS. 10-12, but in other examples air outlet 450 can be radially offset from axis A-A. Air outlet 450 can be oriented to emit air in a direction coaxial with axis A-A or in a direction parallel but not coaxial with axis A-A.

Air is provided to air passage 440 through air inlet 470, which is connected to air passage 440 by screw attachment 480 in the depicted embodiment. Air passage 440 is formed within aerator 410 in the depicted example. In operation, a flow of nucleation air is received at air inlet 470 from an air source (e.g., air source 19 of plural component dispense system 10; FIG. 1), flowed toward elbow 490 downstream direction DD, turned at elbow 490, such as at a right angle though it is understood that other angles are possible, including no turn in examples in which air inlet 470 projects radially from aerator 410 relative to axis A-A. The air is flowed through the remainder of air inlet 470 to air passage 440 along axis B-B. Air passage 440 includes a bend that turns the air, such as at a right angle, to flow in upstream direction UD along axis A-A and to air outlet 450. The nucleation air is then emitted through air outlet 450 and into the flow space through dispensing assembly 400 to aerate the plural component material mixed by mixer 126. Accordingly, air is flowed in a first direction from air inlet 470 toward elbow 490, turned by elbow 490 and turned again by air passage 440 and emitted by air outlet 450 in a second direction opposite the first direction. In other examples, air inlet 470 and air passage 440 can be formed as integrated parts. In yet further examples, air inlet 470 can lack elbow 490, such that air inlet 470 flows nucleation air to air passage 440 without turning the nucleation air. Further, while screw attachment 480, forming a threaded connection, is used to affix air inlet 470 to air passage 440 in the depicted example, another suitable type of attachment can be used in other examples (e.g., a bayonet attachment, an interference fit attachment, etc.).

As illustrated clearly in FIG. 12, flow inlet 460 is formed as an arc that partially circumferentially surrounds air outlet 450. Accordingly, in the depicted example, plural component material flows along a flow path that is coaxial with axis A-A upstream of flow inlet 460. Aerated plural component material flows along a flow path that is parallel with axis A-A but is not coaxial with axis A-A (i.e., that is offset from axis A-A) through flow inlet 460 and along a flow path that is parallel and coaxial with axis A-A_ downstream of flow inlet 460 (i.e., through outlet passage 466 and spray outlet 468). Flow inlet 460 is formed as an approximately 180° arc in FIG. 12, but in other examples, flow inlet 460 can take other suitable shapes. Further, in the example depicted in FIGS. 10-12, flow inlet 460 and are air passage 440 are centered on a single plane extending along axis B-B and perpendicular to axis A-A, such that the aperture formed by flow inlet 460 and air passage 440 are substantially co-planar. However, in other examples, flow inlet 460 and air passage 440 can be formed such that flow inlet 460 and air passage 440 are not co-planar. Flow inlet 460 radially overlaps with air outlet 450 along axis A-A. Components can be considered to radially overlap when the components are disposed at a common location along axis A-A such that a radial line extending from axis A-A passes through each of those radially overlapping components.

While air outlet 450 is described herein as emitting air in a generally upstream direction, in some examples air outlet 450 can be positioned to inject air in a direction transverse to the direction of flow through mixing channel 110 or in a downstream direction. For example, air outlet 450 can be positioned and configured to flow air in a direction that is transverse or perpendicular to axis A-A, or parallel and/or coaxial with axis A-A and in a downstream direction. For example, air outlet 450 can be configured to flow air in a direction that is perpendicular to axis A-A and parallel with axis B-B. As a specific example, air outlet 450 can be configured to flow air directly into the plural component mixture as the plural component mixture flows through flow inlet 450. As yet a further example, air outlet 450 can be configured to flow air in a generally downstream direction to aerate plural component material flowing through outlet passage 466.

Figure 13:
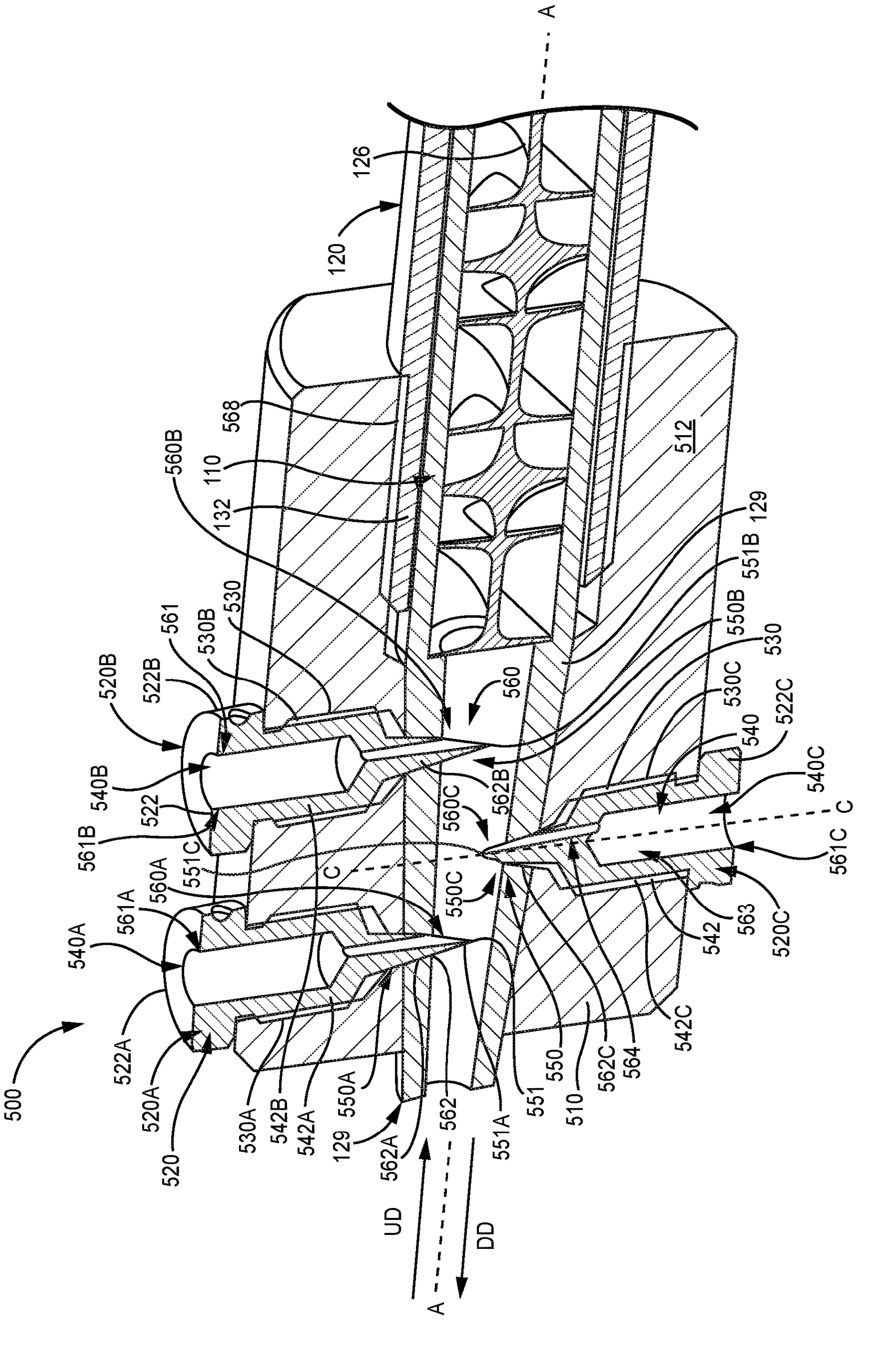
FIG. 13 is an isometric cross-sectional view of yet a further example of a dispensing assembly taken along axis A-A.
Figure 14:
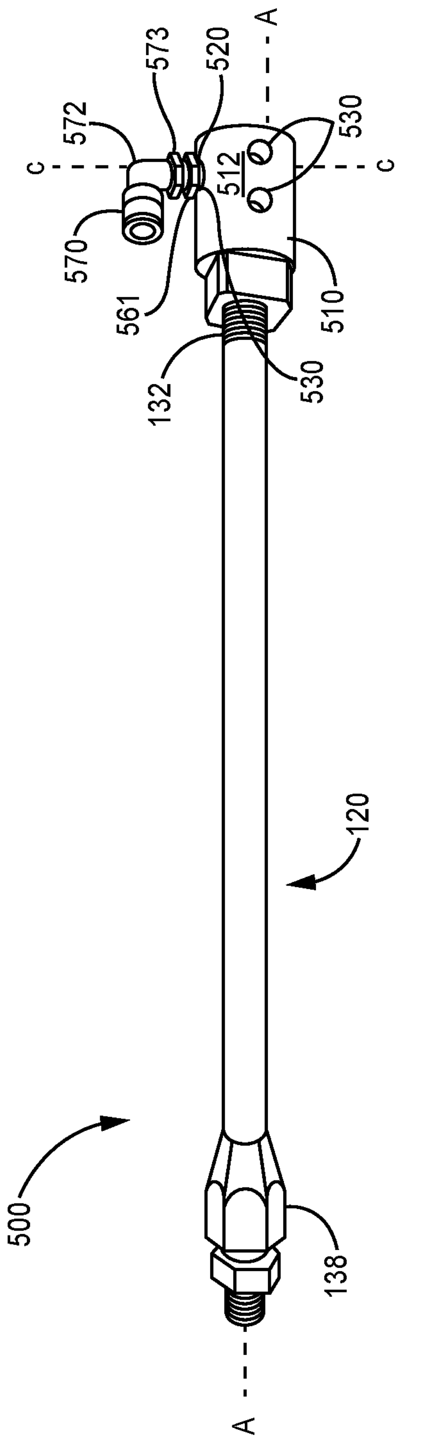
FIG. 14 is an isometric view of the dispensing assembly of FIG. 113.
Figure 15:
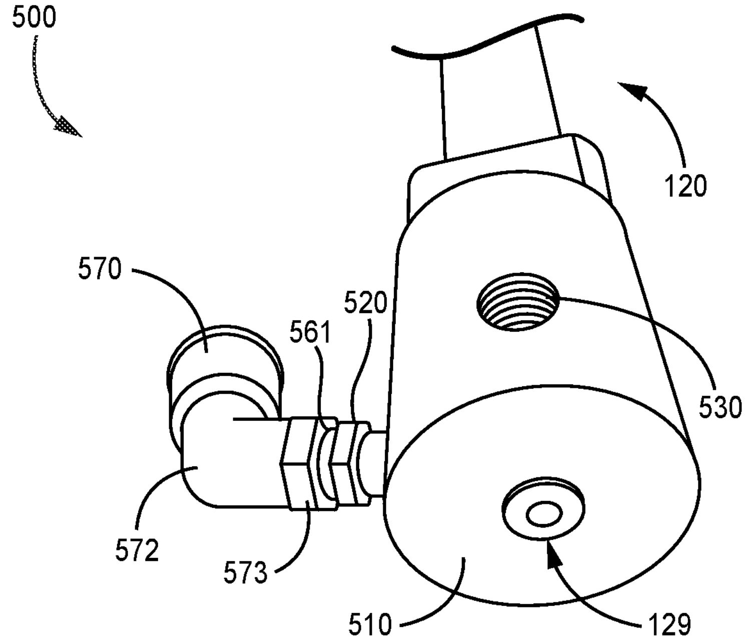
FIG. 15 is a further isometric view of the dispensing assembly of FIGS. 113-14

FIGS. 13-15 depict dispensing assembly 500 and will be discussed together herein. Dispensing assembly 500 is substantially similar to dispensing assembly 100, dispensing assembly 200, dispensing assembly 300, and dispensing assembly 400 in that nucleating air is introduced to the plural component material upstream of an outlet that emits the plural component material from dispensing assembly 500 and downstream of mixer 126. Dispensing assembly 500 is substantially similar to dispensing assembly 100, dispensing assembly 200, and dispensing assembly 300 in that nucleating air is introduced to the plural component material upstream of tip orifice 129 and downstream of mixer 126.

Dispensing assembly 500 includes mixing channel 110, shroud 120, and aerator 510. Aerator 510 includes attachment housing 512 and piercing adapters 520A-C (collectively herein "piercing adapters 520" or "piercing adapter 520"). In some examples, a piercing adapter described herein may be referred to as a "piercing channel." Attachment housing 512 includes receiving apertures 530A-C (collectively herein "receiving apertures 530" or "receiving aperture 530") and piercing adapters 520A-C respectively include housings 522A-C (collectively herein "housings 522" or "housing 522"), passages 540A-C (collectively herein "passages 540" or "passage 540"), attachment sections 542A-C (collectively herein "attachment sections 542" or "attachment section 542"), piercing tips 550A-C (collectively herein "piercing tips 550" or "piercing tip 550"), tips 551A-C (collectively herein "tips 551" or "tip 551"), air outlets 560A-C (collectively herein "air outlets 560" or "air outlet 560"), and passage inlets 561A-C (collectively herein "passage inlets 561" or "passage inlets 561"). Each passage 540 includes an upstream section 563 and a downstream section 564, in FIGS. 13-15 tip portion 122 of mixing channel 110 includes pierced apertures 562A-C, and attachment housing 512 includes attachment portion 568. Each piercing adapter 520 can be connected to an inlet connector 570, which includes elbow 572 and screw attachment 573.

FIG. 13 is an isometric cross-sectional view taken along axis A-A and depicts mixing channel 110, shroud 120, tip portion 122, tip orifice 129, outlet attachment portion 132, aerator 510, attachment housing 512, piercing adapters 520A-C, receiving apertures 530A-C, passages 540A-C, attachment sections 542A-C, piercing tips 550A-C, air outlets 560A-C, pierced apertures 562A-C, attachment portion 568, axis A-A, axis C-C, upstream direction UD, and downstream direction DD.

FIG. 14 is an isometric view of dispensing assembly 500 and depicts shroud 120, outlet attachment region 132, inlet attachment portion 138, aerator 510, attachment housing 512, piercing adapter 520C, receiving apertures 530A-C, inlet connector 570, elbow 572, screw attachment 573, and axis C-C.

FIG. 15 is an enlarged isometric view showing a portion of dispensing assembly 500 and depicts shroud 120, tip orifice 129, piercing adapter 520C, receiving aperture 530A, inlet connector 570, and elbow 572.

Figure 16:
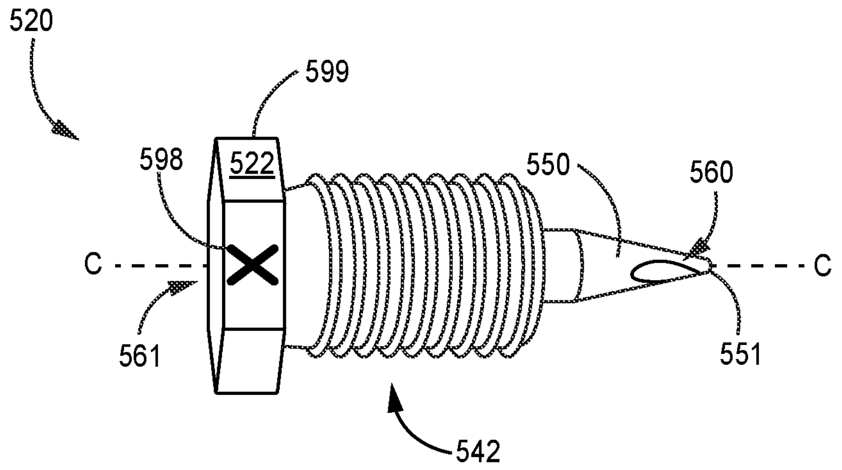
FIG. 16 is an isometric view of a piercing adapter.

FIG. 16 is a perspective view of a piercing adapter 520, and depicts a housing 522, an attachment section 542, a piercing tip 550, an air outlet 560, alignment indicator 598, and axis C-C. FIG. 16 will be discussed together with FIGS. 13-15.

Aerator 510 is an attachment that can be affixed at the downstream end of mixing channel 110 by using, for example, outlet attachment portion 132 of shroud 120. Like aerators 210, 310, and 410, aerator 510 is configured introduce nucleation air into plural component material downstream of mixer 126 to form aerated plural component material. Aerator 510 circumferentially surrounds tip portion 122. The position of aerator 510, and specifically of attachment housing 512, allows piercing adapters 520A-C to form flow paths from outside of aerator 510 through receiving apertures 530A-C and pierced apertures 562A-C, respectively, to inject air upstream of tip orifice 129 and downstream of mixer 126. Pierced apertures 562A-C are apertures formed in tip portion 122 of mixing channel 110 and are sealed circumferentially against the exterior of piercing tips 550A-C, respectively. Pierced apertures 562A-C can be formed using piercing tips 550A-C or by another method, as described in more detail subsequently.

Upstream direction UD and downstream directions DD are shown as arrows indicating the direction of upstream and downstream flow, respectively, in FIG. 13. The upstream direction UD is against the material flow through dispensing assembly 400. Fluid flows through dispensing assembly 400 in downstream direction DD when it flows away from mixer 126 and toward spray outlet 468. Downstream direction DD and upstream direction UD define flow directions that are generally parallel with axis A-A, though all examples may not be so limited.

As shown in FIGS. 14-15, in operation, attachment housing 512 can be configured to receive one piercing adapter 520A-C to flow air into tip portion 122 and tip portion 122 can include one pierced aperture 562A-C to accommodate the piercing tip 550A-C of the singular piercing adapter 520A-C. Piercing adapters 520A-C shown in FIG. 13 are substantially the same and represent alternative locations of a piercing adapter 520 in attachment housing 512. Notably, adding additional piercing adapters 520 to introduce further air can negatively impact the quality of aerated plural component material sprayed by dispensing assembly 500. However, as shown in FIGS. 14-15, attachment housing 512 of aerator 510 can include multiple receiving apertures 530A-C. As will be explained in more detail, adding additional receiving apertures 530A-C can increase the number of possible locations at which a pierced aperture 562A-C can be created and where air can be injected into a plural component material within tip portion 122. Alternatively, attachment housing 512 can include only one receiving aperture 530A-C to simplify assembly of attachment housing 512.

Piercing adapters 520 include housing 522, which defines passages 540, attachment sections 542, piecing tips 550, air outlets 562, and passage inlets 561. Passages 540 flow air from passage inlets 561 to air outlet 560. More specifically, passage inlets 561 receive air from an external air source (e.g., air source 19; FIG. 1) and passages 540 flow that air to the inner volume of tip portion 122 and thereby to air outlets 562. In the depicted example, passage inlets 561 are disposed on an axial end of piercing adapters 520 (i.e., according to axis C-C) opposite piercing tips 550. In other examples, however, passage inlets 561 can be disposed in other locations of piercing adapters 520. In the depicted example, each of passages 540 includes upstream section 563 that connects to an inlet connector 570 and downstream section 564 formed within piercing tips 550, where upstream section 563 has a larger cross-sectional diameter than downstream section 564. In other examples, the cross-sectional diameter of passages 540 can be substantially constant along the length of passages 540. Piercing tip 550 is a tapered cylinder that tapers along axis C-C away from the end of piercing adapter 520 at which passage inlets 561 are formed. Specifically, the diameter and cross-sectional area of piercing tip 550 decrease along axis C-C toward tip 551 and away from passage inlet 561 (i.e., piercing tip 550 tapers along axis C-C toward tip 551 and away from passage inlet 561). Piercing tip 550 tapers to tip 551 at an axially-terminal end of piercing adapter 520 (i.e., according to axis C-C) and is configured to be inserted through and form a seal against pierced aperture 562 to reduce or prevent flow of plural component material and/or aerated plural component material through pierced aperture 562. In at least some examples, piercing tip 550 is also configured to form pierced apertures 562. For example, where attachment section 542 includes screw threading that interfaces with screw threading of receiving aperture 530, attachment section 542 can screw into receiving aperture 530 and the screw interface can be used to axially translate piercing tip 550 (i.e., along axis C-C) and cause tip 551 of piercing tip 550 to penetrate tip portion 122 of channel housing 124, thereby forming a pierced aperture 562 against which tip 551 can form a seal.

Upstream section 563 of passage 540 is partially circumferentially surrounded by attachment section 542. Air outlet 560 is formed inward from terminal end of piercing tip 550 and on a sidewall of piercing tip 550. In the depicted example, the sidewall of air outlet 560 is partially annular, such that air outlet 560 is disposed on a circumferentially-outer surface of piercing tip 550, such that air outlet 560 can be positioned to inject air in an upstream direction when installed in attachment housing 512. Piercing adapters 520 can include an alignment indicator (e.g., alignment indicator 598; FIG. 16) that a user can use to determine the orientation of air outlet 560. Where air outlet 560 is placed on a circumferentially-outer surface of piercing tip 550, the alignment indicator can be placed on the same side of an external portion of the piercing adapter 520 (i.e., external of attachment housing 512), such that air outlet 560 is in the correct orientation when the alignment indicator is pointed in a generally upstream direction (i.e., in upstream direction UD). Air outlet 560 can be aligned with axis A-A or can be radially offset from axis A-A. Air outlet 560 can be oriented to emit air in a direction coaxial with axis A-A or in a direction parallel but not coaxial with axis A-A.

As depicted in FIG. 15, upstream section 563 of passage 540C is centered on axis C-C and downstream section 564 is parallel with but offset from axis C-C. The offset position of downstream section 564 allows downstream section 564 to extend generally parallel to axis C-C in a substantially straight manner while still connecting to air outlet 560C on an upstream side of piercing tip 550. The offset structure of passages 540 shown in FIG. 15 can thereby advantageously simplify the process of manufacturing and/or fabricating downstream section 564 of passages 540 while still allowing passages 540 to connect to an outlet on an upstream side of piercing tips 550.

In the examples shown in FIGS. 14-15, air is provided to passage inlet 561 of air passage 540 of an installed piercing adapter 520 through inlet connector 570, which can be removably attached to the piercing adapter 520 by a screw attachment or another suitable attachment means. In the examples depicted in FIGS. 14-15, inlet connector 570 is connected to piercing adapter 520 at passage inlet 561 by screw attachment 573. In operation, inlet connector 570 receives nucleation air from an air source (e.g., air source 19; FIG. 1) and flows that nucleation air toward elbow 572, where the flow of nucleation air is turned, such as at a right angle though it is understood that other angles are possible, including no turn in examples in which inlet connector 570 projects radially from aerator 510 relative to axis A-A (i.e., in a direction parallel to axis C-C). The nucleation air is then flowed through the remainder of inlet connector 570 to passage inlet 561, then to upstream portion 563 of passage 540, then to downstream portion 564 of passage 540, and then to air outlet 560. Passage 540 turns the air, such as at a right angle, to air outlet 560, which injects the nucleation air in an upstream direction (i.e., against the direction of flow) into plural component material flowing through tip portion 122 of mixing channel 110. As described previously, the plural component material that is aerated by the nucleation air is formed by mixing two or more component materials with mixer 126 in mixing channel 110. The nucleation air aerates the plural component material that can be emitted from mixing channel 110 through tip orifice 129. Air is injected downstream of mixer 126 such that the nucleation air is injected into a mixed (i.e., fully or substantially mixed) plural component material rather than unmixed or partially mixed component materials, which, as described previously, produces aerated plural component materials having more highly desirable foam characteristics (e.g., cell size, cell uniformity, cell density, etc.). Accordingly, air is flowed in a first direction from air inlet 570 toward elbow 572, turned by elbow 572 and turned again by passage 540 and emitted by air outlet 560 in a second direction opposite the first direction. In some examples, the sections of aerator 510 defining the flow path of air into plural component material flowing through tip portion 122 (e.g., piercing adapter, and/or inlet connector 570) can be referred to as an "air line."

While air outlet 560 is described herein as emitting air in a generally upstream direction, in some examples air outlet 560 can be positioned on piercing tip 550 to inject air in a direction transverse to the direction of flow through mixing channel 110 or in a downstream direction. For example, air outlet 560 can be positioned on an axial end of piercing tip 550 (i.e., along axis C-C) and configured to flow air in a direction that is transverse or perpendicular to axis A-A. As another example, air outlet 560 can be positioned on a circumferentially-outer surface of piercing tip 550 (i.e., with respect to axis C-C) and configured to flow air in a direction that is transverse or perpendicular to axis A-A, or parallel and/or coaxial with axis A-A and in a downstream direction.

In the example depicted in FIGS. 13-15, tip portion 122 extends beyond the axially-downstream end of attachment housing 512. In other examples, tip orifice 129 can be used to spray aerated plural component material where tip portion 122 and attachment housing 512 are positioned such that tip orifice 129 has the same axial position along axis A-A as the axially-downstream end of attachment housing 512. In yet further examples, attachment housing 512 or another element of aerator 510 can include a downstream channel that receives aerated plural component material from tip orifice 129 and flows the aerated plural component material to an additional spray orifice configured to emit the aerated plural component mixture as a spray.

Attachment portion 568 of aerator 510 is configured to interface with outlet attachment portion 132 to allow attachment portion 568 to attach to shroud 120. In the depicted example, attachment portion 568 comprises screw threads that interface with screw threads of outlet attachment portion 132. In other examples, attachment portion 568 and outlet attachment portion 132 can interface by any suitable connector or interface type, such as a bayonet connector, an interference fit attachment, or a sleeve connector, among other options. In other examples, attachment portion 568 can be configured to attach directly to mixing channel 110.

Attachment sections 542A-C of piercing adapters 520A-C are configured to interface with receiving apertures 530A-C of aerator 510. As shown with respect to attachment section 542C of piercing adapter 520C in FIG. 16, attachment section 542C includes screw threading that can interface with screw threading on receiving apertures 530A-C. In some examples, the screw threading on attachment sections 542A-C can be configured such that, when fully tightened against receiving apertures 530A-C, air outlets 560A-C are oriented to inject air in an upstream direction. In other examples, attachment sections 542A-C and receiving aperture 530A-C can interface by anu suitable connector or interface type, such as a bayonet connector, an interference fit attachment, or a sleeve connector, among other options.

Aerator 510 can be installed on mixing channel 110 and shroud 120 by affixing attachment housing 512 to outlet attachment portion 132 with attachment portion 568. When attachment housing 512 is attached, a pierced aperture 562 can be created. In some examples, a receiving aperture 530 can be used as a guide to drill a pierced aperture 562. Following drilling, a piercing adapter 520 can be inserted such that the air outlet 560 of the piercing adapter 520 extends into the inner space of tip portion 122 and that the piercing tip 550 forms a seal against the pierced aperture 562. Accordingly, the surface or sidewall of piercing tip 550 includes air outlet 560 and forms a seal against pierced aperture 562 to reduce or prevent leakage of plural component material through pierced aperture 562. In other examples, piercing tip 550 can be used to form the pierced aperture 562 in tip portion 122. Specifically, piercing adapter 520 can be tightened into a receiving aperture 530 using screw threads (i.e., screw threads of attachment section 542 and receiving apertures 530) or another suitable means to allow piercing tip 550 to penetrate channel housing 124 at tip portion 122. piercing adapter 520 can then be positioned such that air outlet 560 is pointed to inject air in an upstream direction (i.e., toward mixer 126) in tip portion 122.

Although aerators 410, 510 have been described herein as attachments for shroud 120 and/or mixing channel 110, in some examples, aerators 410, 510 can be formed integrally with one or more of shroud 120 and/or mixing channel 110. In these examples, aerators 410, 510 can be referred to as components of shroud 120 and/or mixing channel 110, respectively. For example, in examples where shroud 120 is omitted from a dispensing assembly, aerators 410, 510 can be formed integrally with mixing channel 110. Similarly, in examples including shroud 120, aerators 410, 510 can be formed integrally with shroud 120 and mixing channel 110 can be inserted into the integral shroud 120 and aerator 410, 510 assembly before the resulting dispensing assembly is used to dispense an aerated plural component material.

FIG. 16 is an isometric view of piercing adapter 520 that shows housing 522, attachment section 542, piercing tip 550, tip 551, air outlet 560, passage inlet 561, alignment indicator 598, adapter head 599, and axis C-C. As depicted in FIG. 16, air outlet 560 is located at an axial end of piercing adapter 520 (i.e., along axis C-C) and formed by an axial end of housing 522. The axial end of housing 522 opposite passage inlet 561 forms piercing tip 550. Piercing tip 550 includes air outlet 560 and tip 551. As described previously, air can flow through piercing adapter 520 from passage inlet 561 to air outlet 560, thereby allowing piercing adapter 520 to deliver air from an external air source to plural component material mixed in mixing channel 110. As shown more clearly in FIG. 16, the axial end of housing 522 that defines passage inlet 561 also defines adapter head 599, such that adapter head 599 circumferentially surrounds passage inlet 561. Adapter head 599 extends beyond attachment housing 512 when piercing adapter 520 is installed in a receiving aperture 530 of attachment housing 512. Adapter head 599 allows a user to grip piercing adapter 520 during installation of piercing adapter 520 in attachment housing 512. For example, where attachment section 542 is screw threading, adapter head 599 can form a tool interface to allow a user to grip piercing adapter 520 (e.g., with a tool such as a wrench) as the user turns piercing adapter 520 to interface with screw threading of receiving aperture 530.

Alignment indicator 598 is disposed on adapter head 599 and is configured to enable a user to align air outlet 560 with the upstream direction of dispensing assembly 600 such that air outlet 560 can emit air into tip portion 122 of mixing channel 110 in a generally upstream direction to aerate plural component material. Alignment indicator 598 is shown as an "X" character in FIG. 16, but in other examples, any suitable character for indicating the position of air outlet 560 can be used. Alignment indicator 598 can be made using any other suitable technique, such as an engraving, painting, etching, among other options. In the depicted example, alignment indicator 598 is aligned with air outlet 560, such that a user can use the visual position of alignment indicator 598 in order to position of air outlet 560 in a desired orientation for flowing air into plural component material flowing through mixing channel 110. In the depicted example, a user can position alignment indicator to be facing in upstream direction UD of dispensing assembly 600 to position air outlet 560 such that air is emitted in upstream direction UD. In other examples, alignment indicator 598 can be positioned in a different known orientation relative to air outlet 560, and a user can use the known circumferential offset of air outlet 560 and alignment indicator 598 to properly position air outlet 560. For example, other examples, air outlet 560 and alignment indicator 598 can be circumferentially opposed (i.e., offset 180° about axis C-C), such that air outlet 560 is positioned to emit air in an upstream direction when alignment indicator 598 faces in downstream direction DD of dispensing assembly 600.

As described previously, the embodiments shown in FIGS. 4-16 allow for relatively low-pressure air to be used to create high-quality aerated plural component materials. For example, pressures as low as 30-100 psi (about 0.2 megapascal (MPa) to about 0.69 MPa) can be used to create aerated plural component mixtures having desirable characteristics (e.g., cell size, cell uniformity, cell density, etc.). In all examples, the pressure of air flowing through air passages 240, 340, 440 and passage 540 and at outlets 250, 350, 450, 560, respectively, is sufficient to significantly reduce or prevent back flow of sprayed material through outlets 250, 350, 450, 560 respectively, which can damage components of a spray dispensing assemblies 200, 300, 400, 500, respectively, or another component connected to a dispensing system including the spray dispensing assemblies 200, 300, 400, 500.

Figure 17:
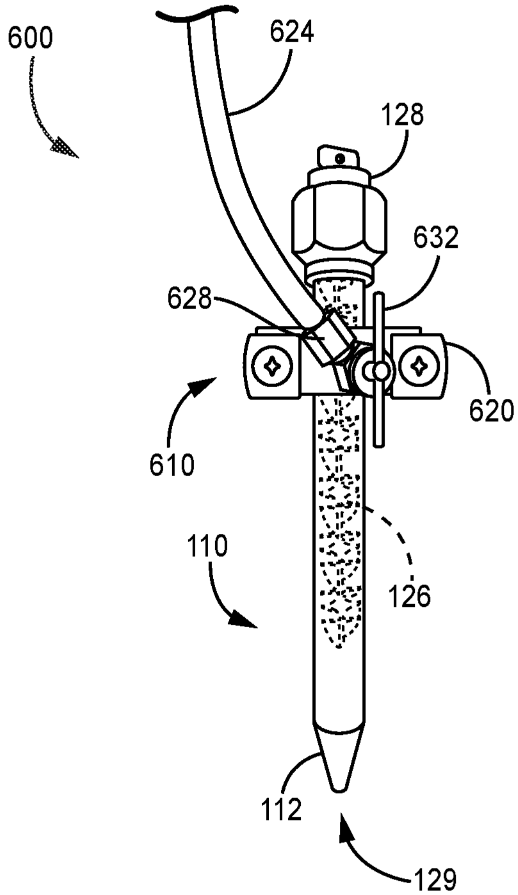
FIG. 17 is an isometric view of yet another example of a dispensing assembly.

In some examples, air can be introduced at a point along mixer 126 to produce aerated plural component mixture have acceptable foam qualities. FIG. 17 is a perspective view of dispensing assembly 600, which introduces air at a location upstream of the downstream end of mixer 126 to aerate the plural component material. Dispensing assembly 600 includes mixing channel 110 and aerating sleeve 610. Aerating sleeve 610 includes air inlet channel 624, air inlet 628, valve 632, an air passage extending through housing 124 of mixing channel 126, and an air outlet disposed at the interior end of the air passage. The air outlet of aerating sleeve 610 is configured to inject air in an upstream direction through mixer 126. Accordingly, aerating sleeve 610 allows for air to be flowed through channel housing 124 to aerate a flow of component materials flowing through mixer 126. The upstream air injection of aerating sleeve 610 provides the benefits of upstream air injection described previously with respect to dispensing assemblies 200, 300, 400, 500. In other examples, aerating sleeve can inject air in a direction transverse or perpendicular to the direction of flow, or parallel to the direction of flow and in a downstream direction. Air inlet channel 624 delivers air from an air source (e.g., air source 19; FIG. 1) to air inlet 628, where it is flowed to the air passage extending through housing 124 and into component materials flowing through mixer 126 of mixing channel 110. The air is flowed in an upstream direction and aerates the component materials flowing through mixer 126 in a downstream direction. The aerated component materials become fully mixed as they pass through the remainder of mixer 126 and are subsequently emitted from tip orifice 129 of mixing channel 110. Valve 632 can be used to selectively allow flow into the flow space defined by channel housing 124 of mixing channel 110. Valve 632 can be any suitable type of valve and can be mechanically- and/or electrically-actuated. Valve 632 is actuatable to control a volume of air flowing to mixing channel 110. Valve 632 can be actuated to a closed position to stop flow of air into mixing channel 110. Dispensing assembly 600 is not depicted as including shroud 120, but in other examples, dispensing assembly 600 can include shroud 120 and the air passage of dispensing assembly 600 can extend through both channel housing 124 and shroud housing 134 to flow air into component materials mixing in mixing channel 110.

The nucleation air used by dispenser assembly 600 can be any inert gas or combination of inert gases. For example, the air can include one or more of $N_2$, $O_2$, $CO_2$, or a noble gas, among other options. As a specific example, the air or nucleation air can be entirely $N_2$, $O_2$, or $CO_2$, or can include a combination of $N_2$, $O_2$, and $CO_2$. In yet further examples, the air can be an atmospheric air.

Dispensing assembly 600 also offers a number of advantages. Specifically, as dispensing assembly 600 injects air at mixer 126, plural component dispense system 10 does not require the specialized components used by existing plural component dispensing systems to introduce air at a point upstream of dispensing assembly 600 where the component materials are at higher pressure. Accordingly, dispensing assembly 600 allows for aerated plural component materials to be produced using simpler and less expensive dispensing systems than what is required by existing dispensing systems.

Discussion of Possible Embodiments

The following are non-exclusive descriptions of possible embodiments of the present invention.

An embodiment of a nozzle assembly includes a mixing channel having upstream and downstream ends defining a flow direction through the mixing channel and an aerator configured to flow nucleation air to a location downstream of the mixer and into a flow of the plural component material, the mixing channel comprising a housing wall and a mixer. The housing wall comprises an inlet portion disposed at the upstream end and configured to receive a first material and a second material and a tip orifice disposed at the downstream end and configured to emit a plural component material from the mixing channel. The mixer is disposed within the mixing channel, the mixer configured to mix the first material and the second material into the plural component material.

The nozzle assembly of the preceding paragraph can optionally include, additionally and/or alternatively, any one or more of the following features, configurations and/or additional components:

A further embodiment of the foregoing nozzle assembly, wherein the aerator comprises a nucleation air passage extending from an exterior of the housing into the flow passage.

A further embodiment of any of the foregoing nozzle assemblies, wherein the nucleation air passage extends through the housing wall.

A further embodiment of any of the foregoing nozzle assemblies, wherein the housing wall comprises a tapered section extending from a point downstream of the mixer to the tip orifice and the nucleation air passage extends through the tapered section of the housing wall.

A further embodiment of any of the foregoing nozzle assemblies, wherein the nucleation air passage extends through the tip orifice.

A further embodiment of any of the foregoing nozzle assemblies, wherein the nucleation air passage is non-linear.

A further embodiment of any of the foregoing nozzle assemblies, wherein the mixing channel extends along an axis and the aerator comprises an attachment housing disposed at a downstream end of the mixing channel, the attachment housing defining an air outlet configured to flow nucleation air to a location downstream of the tip orifice to create aerated plural component material, a flow inlet radially overlapping, with respect to the axis, with the air outlet, the flow inlet configured to accept a flow of aerated plural component material, a spray outlet downstream of the flow inlet for emitting the aerated plural component material, and an outlet passage that fluidly connects the flow inlet to the spray outlet.

A further embodiment of any of the foregoing nozzle assemblies, further comprising a shroud at least partially surrounding an exterior of the mixing channel, wherein the attachment housing is attached to a downstream end of the shroud.

A further embodiment of any of the foregoing nozzle assemblies, wherein the aerator is configured to flow nucleation air in an upstream direction relative to the flow of the plural component material.

A further embodiment of any of the foregoing nozzle assemblies, wherein the mixing channel is configured to flow the first material, the second material, and the plural component material in a first direction, the aerator is configured to flow nucleation air in a second direction, and the first direction is opposite the second direction.

A further embodiment of any of the foregoing nozzle assemblies, wherein the static mixer defines a helically-shaped section of the flow passage and the helically-shaped section is configured to mix the first material and the second material.

A further embodiment of any of the foregoing nozzle assemblies, wherein the aerator comprises a housing, the housing comprising a tapered tip at a first end of the housing, an air outlet defined in the tapered tip, an air inlet formed in a second end of the housing, and an air passage defined by the housing fluidly connecting the air inlet to the air outlet, wherein the aerator is configured to the flow nucleation air from the air inlet to the air outlet and from the air outlet into the flow of the plural component material.

A further embodiment of any of the foregoing nozzle assemblies, and further comprising a shroud at least partially surrounding the mixing channel.

A further embodiment of any of the foregoing nozzle assemblies, wherein an inner surface of the shroud contacts an outer surface of the mixing channel.

An embodiment of a method of dispensing a plural component material includes receiving a first material and a second material at an inlet of a mixing channel, the mixing channel having upstream and downstream ends defining a first flow direction through the mixing channel, and the mixing channel comprising a housing wall defining a flow passage, flowing the first material and the second material through a mixer disposed within the flow passage to produce a plural component material, flowing nucleation air into the plural component material at a location downstream of the mixer in a second flow direction to form an aerated plural component material, and dispensing the aerated plural component material.

The method of the preceding paragraph can optionally include, additionally and/or alternatively, any one or more of the following features, configurations and/or additional components:

A further embodiment of the foregoing method, wherein flowing the nucleation air into the plural component material comprises flowing the nucleation air through an air passage extending through the tip orifice.

A further embodiment of any of the foregoing methods, wherein dispensing the aerated plural component material comprises dispensing the aerated plural component material from the tip orifice.

A further embodiment of any of the foregoing methods, wherein dispensing the aerated plural component material comprises flowing the aerated plural component material through an outlet passage downstream of the tip orifice and dispensing the aerated plural component material from a spray outlet downstream of the outlet passage.

A further embodiment of any of the foregoing methods, wherein the second flow direction is opposite the first flow direction.

A further embodiment of any of the foregoing methods, wherein flowing the nucleation air through the plural component material comprises flowing the nucleation air from an air source exterior to the housing through an air passage extending through the housing wall and further flowing the nucleation air through a nucleation air orifice disposed within the flow passage.

A further embodiment of any of the foregoing methods, wherein flowing the nucleation air through the plural component material comprises flowing the nucleation air through a non-linear channel extending from an exterior air source through the tip orifice and further flowing the nucleation air through a nucleation air orifice formed at a tip of the non-linear channel disposed within the flow passage.

A further embodiment of any of the foregoing methods, wherein the nucleation air has a pressure of 40 pounds per square inch at the nucleation air orifice.

A further embodiment of any of the foregoing methods, wherein flowing the first material and the second material through the mixer to produce the plural component material comprises flowing the first material and the second material through a helical passage and the helical passage extends along a helical axis parallel to the first flow direction.

An embodiment of a method of forming a nozzle assembly includes inserting a polymer mixing tube into a shroud, forming a hole in the polymer mixing tube using the guide hole and inserting a nucleating air channel through the guide hole and the hole in the polymer mixing tube to extend into the flow passage. The polymer mixing tube comprises a polymer wall defining a flow passage having upstream and downstream ends and a mixer disposed downstream of the inlet portion and upstream of the tip orifice, the mixer configured to mix the first material and the second material into the plural component material. The polymer wall comprise an inlet portion disposed at the upstream end and configured to receive a first material and a second material and a tip orifice disposed at the downstream end and configured to emit a plural component mixture formed from the first material and the second material. The shroud comprises a shroud wall that at least partially circumferentially surrounds the polymer mixing tube when the polymer tube is inserted into the shroud and a guide hole that extends through the shroud wall.

An embodiment of a nozzle assembly includes a mixing channel having upstream and downstream ends defining a flow direction through the mixing channel and an aerator. The mixing channel comprises a housing wall defining a flow passage and a mixer disposed within the mixing channel, the mixer configured to mix the first material and the second material into the plural component material, the housing wall comprising an inlet portion disposed at the upstream end and configured to receive a first material and a second material a tip orifice disposed at the downstream end and configured to emit a plural component material from the mixing channel. The aerator is configured to flow nucleation air into the flow passage at a location downstream of the mixer and into a flow of the plural component material, the aerator comprising a nucleation air line extending through the housing wall, the air line defining an internal air passage.

The nozzle assembly of the preceding paragraph can optionally include, additionally and/or alternatively, any one or more of the following features, configurations and/or additional components:

A further embodiment of the foregoing nozzle assembly, wherein the housing wall comprises a tapered section extending from a point downstream of the mixer to the tip orifice and the nucleation air line extends through the tip section.

A further embodiment of any of the foregoing nozzle assemblies, wherein the mixing channel is configured to flow the plural component material in a first direction, the aerator is configured to flow nucleation air in a second direction, and the first direction is opposite the second direction.

A further embodiment of any of the foregoing nozzle assemblies, wherein the aerator is configured to accept a flow of nucleation air flowing in a first air direction and is further configured to turn the flow of nucleation air to flow the nucleation air into the flow of the plural component material in a second air direction opposite the first.

An embodiment of a nozzle assembly includes a mixing channel having upstream and downstream ends defining a flow direction through the mixing channel and an aerator. The mixing channel comprises a housing wall defining a flow passage and a mixer disposed within the mixing channel, the mixer configured to mix the first material and the second material into the plural component material, the housing wall comprising an inlet portion disposed at the upstream end and configured to receive a first material and a second material a tip orifice disposed at the downstream end and configured to emit a plural component material from the mixing channel. The aerator is configured to flow nucleation air into the flow passage at a location downstream of the mixer and into a flow of the plural component material, the aerator comprising a nucleation air line extending through the housing wall, the air line defining an internal air passage.

The nozzle assembly of the preceding paragraph can optionally include, additionally and/or alternatively, any one or more of the following features, configurations and/or additional components:

A further embodiment of the foregoing nozzle assembly, wherein the mixing channel is configured to flow the plural component material in a first direction, the aerator is configured to flow nucleation air in a second direction, and the first direction is opposite the second direction.

A further embodiment of any of the foregoing nozzle assemblies, wherein the aerator is configured to accept a flow of nucleation air flowing in a first air direction and is further configured to turn the flow of nucleation air to flow the nucleation air into the flow of the plural component material in a second air direction opposite the first.

An embodiment of a nozzle assembly includes a mixing channel having upstream and downstream ends defining a flow direction through the mixing channel and an aerator. The mixing channel comprises a housing wall defining a flow passage and a mixer disposed within the mixing channel, the mixer configured to mix the first material and the second material into the plural component material, the housing wall comprising an inlet portion disposed at the upstream end and configured to receive a first material and a second material a tip orifice disposed at the downstream end and configured to emit a plural component material from the mixing channel. The aerator is configured to flow nucleation air into the flow passage at a location downstream of the mixer and into a flow of the plural component material, the aerator comprising a nucleation air line extending through the housing wall, the air line defining an internal air passage. The aerator is aerator configured to flow nucleation air into a flow of the plural component material downstream of the mixer, the aerator comprising an attachment housing disposed at a downstream end of the mixing channel an air outlet configured to flow nucleation air out of the attachment housing and into the plural component material at a location downstream of the tip orifice to create an aerated plural component material, a flow inlet extending from upstream of the air outlet to downstream of the air outlet, the flow inlet configured to accept a flow of aerated plural component material, and a spray outlet downstream of the flow inlet for emitting the aerated plural component material from the attachment housing.

The nozzle assembly of the preceding paragraph can optionally include, additionally and/or alternatively, any one or more of the following features, configurations and/or additional components:

A further embodiment of the foregoing nozzle assembly, wherein the flow inlet at least partially circumferentially surrounds the air outlet.

A further embodiment of any of the foregoing nozzle assemblies, wherein the aerator is configured to accept a flow of nucleation air flowing in a first air direction and is further configured to turn the flow of nucleation air to flow the nucleation air into the flow of the plural component material in a second air direction opposite the first.

A further embodiment of any of the foregoing nozzle assemblies, wherein the mixing channel is configured to flow the plural component material in a first direction along the axis, the aerator is configured to flow nucleation air in a second direction, and the first direction is opposite the second direction.

A further embodiment of any of the foregoing nozzle assemblies, and further comprising a shroud at least partially surrounding an exterior of the mixing channel, wherein the attachment housing is attached to a downstream end of the shroud.

A further embodiment of any of the foregoing nozzle assemblies, wherein the air outlet extends along an outlet axis and the flow direction extends along a flow axis that is at least partially coaxial with the outlet axis.

An embodiment of a nozzle assembly includes a mixing channel having upstream and downstream ends defining a flow direction through the mixing channel and an aerator. The mixing channel comprises a housing wall defining a flow passage and a mixer disposed within the mixing channel, the mixer configured to mix the first material and the second material into the plural component material, the housing wall comprising an inlet portion disposed at the upstream end and configured to receive a first material and a second material a tip orifice disposed at the downstream end and configured to emit a plural component material from the mixing channel. The aerator comprises a tapered tip at a first end of a passage housing, an air outlet defined in the tapered tip, an air inlet formed in the passage housing, and an air passage defined by the passage housing, the air passage fluidly connecting the air inlet to the air outlet, wherein the aerator is configured to the flow nucleation air from the air inlet to the air outlet and from the air outlet into the flow passage at a location downstream of the mixer and into a flow of the plural component material.

The nozzle assembly of the preceding paragraph can optionally include, additionally and/or alternatively, any one or more of the following features, configurations and/or additional components:

A further embodiment of the foregoing nozzle assembly, wherein the aerator further comprises an attachment housing disposed at a downstream end of the mixing channel, wherein the attachment housing extends along an axis, the attachment housing defines a plurality of receiving apertures at a plurality of axial positions, and each receiving aperture of the plurality of receiving apertures is configured to receive the passage housing.

A further embodiment of any of the foregoing nozzle assemblies, and further comprising a shroud at least partially surrounding an exterior of the mixing channel, wherein the attachment housing is attached to a downstream end of the shroud.

A further embodiment of any of the foregoing nozzle assemblies, wherein the mixing channel is configured to flow plural component material in a first direction, the air outlet of the aerator is configured to flow nucleation air in a second direction into the flow of plural component material, and the first direction is opposite the second direction.

A further embodiment of any of the foregoing nozzle assemblies, wherein the tapered tip extends through an aperture formed in the housing wall, such that the air outlet is disposed within the mixing channel and the air inlet is disposed outside of the mixing channel.

A further embodiment of any of the foregoing nozzle assemblies, wherein the tapered tip forms a seal against the aperture.

A further embodiment of any of the foregoing nozzle assemblies, wherein the aerator extends along an aerator axis and the air outlet is defined, with respect to the aerator axis, in a circumferentially outer surface of the tapered tip.

A further embodiment of any of the foregoing nozzle assemblies, wherein the air inlet is formed in a second end of the passage housing.

A further embodiment of any of the foregoing nozzle assemblies, wherein the second end is opposite the first end.

A further embodiment of any of the foregoing nozzle assemblies, wherein the air passage includes a first section and a second section, the first section extends along a first axis, the second section extends along a second axis, the first and second axes are offset, such that the first and second axes are not coaxial.

A further embodiment of any of the foregoing nozzle assemblies, wherein the first and second axes are parallel.

An embodiment of an aerator includes a tapered tip at a first end of a passage housing, the passage housing extending along an axis, an air outlet defined in the tapered tip, an air inlet formed in a second end of the passage housing, and an air passage defined by the passage housing, the air passage fluidly connecting the air inlet to the air outlet.

The aerator of the preceding paragraph can optionally include, additionally and/or alternatively, any one or more of the following features, configurations and/or additional components:

A further embodiment of the foregoing aerator, wherein the air outlet extends through a circumferentially outer surface of the tapered tip.

A further embodiment of any of foregoing aerators, wherein the air passage includes a first section and a second section, the first section extends along a first axis, the second section extends along a second axis, the first and second axes are offset, such that the first and second axes are not coaxial.

A further embodiment of any of foregoing aerators, wherein the first and second axes are parallel.

An embodiment of a nozzle assembly includes a mixing channel having upstream and downstream ends defining a flow direction through the mixing channel and an aerator. The mixing channel comprises a housing wall defining a flow passage and a mixer disposed within the mixing channel, the mixer configured to mix the first material and the second material into the plural component material, the housing wall comprising an inlet portion disposed at the upstream end and configured to receive a first material and a second material a tip orifice disposed at the downstream end and configured to emit a plural component material from the mixing channel. The aerator is configured to flow nucleation air to a location downstream of an upstream end of the mixer and into a flow of the plural component material.

The nozzle assembly of the preceding paragraph can optionally include, additionally and/or alternatively, any one or more of the following features, configurations and/or additional components:

A further embodiment of the foregoing nozzle assembly, wherein the aerator is configured to flow nucleation air to a location downstream of an upstream end of the mixer and upstream of a downstream end of the mixer.

A further embodiment of any of the foregoing nozzle assemblies, wherein the aerator is configured to flow nucleation air to a location downstream of a downstream end of the mixer.

A further embodiment of any of the foregoing nozzle assemblies, wherein the aerator comprises an air line that extends through the housing wall.

A further embodiment of any of the foregoing nozzle assemblies, wherein the aerator comprises an air line that extends through the tip orifice.

A further embodiment of any of the foregoing nozzle assemblies, wherein the aerator is configured to flow nucleation air to a location downstream of the tip orifice.

An embodiment of a method of aerating a plural component material includes receiving a first material and a second material at an inlet of a mixing channel, the mixing channel having upstream and downstream ends defining a first flow direction through the mixing channel, and the mixing channel comprising a housing wall defining a flow passage, flowing the first material and the second material through a mixer disposed within the flow passage to produce a plural component material, and flowing nucleation air into the plural component material at a location downstream of an upstream end of the mixer and into the plural component material in a second flow direction to form an aerated plural component material.

The method of the preceding paragraph can optionally include, additionally and/or alternatively, any one or more of the following features, configurations and/or additional components:

A further embodiment of the foregoing method, and further comprising dispensing the aerated plural component material onto a substrate.

A further embodiment of any of the foregoing methods, wherein flowing the nucleation air into the plural component material at the location downstream of an upstream end of the mixer comprises flowing the nucleation air to a location downstream of a downstream end of the mixer.

A further embodiment of any of the foregoing methods, wherein flowing the nucleation air into the plural component material at the location downstream of an upstream end of the mixer further comprises flowing the nucleation air to a location upstream of a downstream end of the mixer.

A further embodiment of any of the foregoing methods, wherein flowing the nucleation air into the plural component material at the location downstream of an upstream end of the mixer comprises flowing the nucleation air through an air passage extending through the housing wall.

A further embodiment of any of the foregoing methods, wherein dispensing the aerated plural component material comprises dispensing the aerated plural component material from a tip orifice formed in the downstream end of the mixing channel.

A further embodiment of any of the foregoing methods, wherein flowing the nucleation air into the plural component material at the location downstream of an upstream end of the mixer comprises flowing the nucleation air through an air passage extending through a tip orifice formed in the downstream end of the mixing channel.

A further embodiment of any of the foregoing methods, wherein dispensing the aerated plural component material comprises dispensing the aerated plural component material from the tip orifice.

A further embodiment of any of the foregoing methods, wherein flowing the nucleation air into the plural component material at the location downstream of the downstream end of the mixer comprises flowing the nucleation air at a location downstream of a tip orifice formed in a downstream end of the mixing channel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nozzle assembly comprising:

a mixing channel having upstream and downstream ends defining a flow direction through the mixing channel, the mixing channel comprising:

a housing wall defining a flow passage, the housing wall comprising:

an inlet portion disposed at the upstream end and configured to receive a first material and a second material; and a tip orifice disposed at the downstream end, the tip orifice configured to emit the plural component material from the mixing channel;

a static mixer disposed within the mixing channel, the mixer configured to mix the first material and the second material into the plural component material; and an aerator projecting from outside of the mixing channel and into the flow passage, the aerator configured to flow nucleation air into the flow passage at a location downstream of a downstream end of the mixer and upstream of the tip orifice such that the nucleation air is emitted into a flow of the plural component material prior to the plural component material exiting the flow channel through the tip orifice, and the aerator disposed such that the plural component material flows around a portion of the aerator disposed in the flow passage.

2. The nozzle assembly of claim 1, wherein the aerator comprises a nucleation air passage extending from an exterior of the housing wall into the flow passage.

3. The nozzle assembly of claim 2, wherein the nucleation air passage extends through the housing wall.

4. The nozzle assembly of claim 2, wherein:

the housing wall comprises a tapered section extending from a point downstream of the mixer to the tip orifice; and the nucleation air passage extends through the tapered section of the housing wall.

5. The nozzle assembly of claim 2, wherein the nucleation air passage extends through the tip orifice.

6. The nozzle assembly of claim 2, wherein the nucleation air passage is non-linear.

7. The nozzle assembly of claim 1, wherein the mixing channel extends along an axis and the aerator comprises an attachment housing disposed at a downstream end of the mixing channel, the attachment housing defining:

an air outlet configured to flow the nucleation air to a location downstream of the tip orifice to create aerated plural component material;

a flow inlet radially overlapping, with respect to the axis, with the air outlet, the flow inlet configured to accept a flow of aerated plural component material;

a spray outlet downstream of the flow inlet for emitting the aerated plural component material; and an outlet passage that fluidly connects the flow inlet to the spray outlet.

8. The nozzle assembly of claim 7, and further comprising a shroud at least partially surrounding an exterior of the mixing channel, wherein the attachment housing is attached to a downstream end of the shroud.

9. The nozzle assembly of claim 1, wherein the aerator is configured to flow the nucleation air in an upstream direction relative to the flow of the plural component material.

10. The nozzle assembly of claim 1, wherein:

the mixing channel is configured to flow the first material, the second material, and the plural component material in a downstream direction towards the tip orifice;

the aerator is configured to flow the nucleation air in an upstream direction opposite the downstream direction.

11. The nozzle assembly of claim 1, wherein aerator comprises a housing, the housing comprising:

a tapered tip at a first end of the housing;

an air outlet defined in the tapered tip;

an air inlet formed in a second end of the housing; and an air passage defined by the housing fluidly connecting the air inlet to the air outlet;

wherein the aerator is configured to flow the nucleation air from the air inlet to the air outlet and from the air outlet into the flow of the plural component material.

12. A method of dispensing a plural component material, the method comprising:

receiving a first material and a second material at an inlet of a mixing channel, the mixing channel having upstream and downstream ends defining a first flow direction through the mixing channel, and the mixing channel comprising a housing wall defining a flow passage, wherein the housing wall includes an inlet portion disposed at the upstream end and configured to receive the first material and the second material and a tip orifice disposed at the downstream end of the mixing channel and configured to emit a plural component material from the mixing channel;

flowing the first material and the second material through a mixer disposed within the mixing channel to produce a plural component material; and flowing nucleation air through an aerator projecting from outside of the mixing channel and into the flow passage and into the plural component material at a location downstream of a downstream end of the mixer and upstream of the tip orifice such that the plural component material flows around a portion of the aerator disposed in the flow passage and such that the nucleation air is emitted into the flow of plural component material to form an aerated plural component material prior to the plural component material exiting the flow channel through the tip orifice.

13. The method of claim 12, and further comprising dispensing the aerated plural component material.

14. The method of any of claim 13, wherein dispensing the aerated plural component material comprises:

flowing the aerated plural component material through an outlet passage downstream of the tip orifice; and dispensing the aerated plural component material from a spray outlet downstream of the outlet passage.

15. The method of claim 12, wherein flowing the nucleation air into the plural component material comprises flowing the nucleation air through an air passage extending through the tip orifice.

16. The method of claim 12, wherein flowing nucleation air through an aerator extending into the flow passage and into the plural component material includes:

flowing the nucleation air flow the nucleation air into the flow passage in an upstream direction opposite a downstream direction, wherein the mixing channel is configured to flow the first material, the second material, and the plural component material in the downstream direction towards the tip orifice.

17. The method of claim 12, wherein flowing the nucleation air through the plural component material comprises flowing the nucleation air from an air source exterior to the housing through an air passage extending through the housing wall and further flowing the nucleation air through a nucleation air orifice disposed within the flow passage.

18. The method of any of claim 12, wherein the air passage is a non-linear channel extending from the exterior air source through the tip orifice and the nucleation air orifice is formed at a tip of the non-linear channel disposed within the flow passage.

19. A nozzle assembly comprising:

a mixing channel having upstream and downstream ends defining a flow direction through the mixing channel, the mixing channel comprising:

a housing wall defining a flow passage, the housing wall comprising:

an inlet portion disposed at the upstream end and configured to receive a first material and a second material; and a tip orifice disposed at the downstream end, the tip orifice configured to emit a plural component material from the mixing channel;

a static mixer disposed within the mixing channel, the mixer configured to mix the first material and the second material into the plural component material; and an aerator extending into the flow passage and configured to flow nucleation air into the flow passage at a location downstream of an upstream end of the mixer and upstream of the tip orifice such that the nucleation air is emitted into a flow of the plural component material prior to the plural component material exiting the flow channel through the tip orifice, the aerator configured to flow a stream of the nucleation air into the plural component material in an upstream direction relative to the flow of the plural component material.

* * * * *